(12) United States Patent
Hou et al.

(10) Patent No.: US 10,013,126 B2
(45) Date of Patent: Jul. 3, 2018

(54) ELECTRONIC APPARATUS AND SINGLE-LAYER MULTI-POINT MUTUAL CAPACITIVE TOUCH SCREEN THEREOF

(71) Applicant: FOCALTECH SYSTEMS CO., LTD., Hsinchu (TW)

(72) Inventors: Weijing Hou, Guangdong (CN); Hui Liu, Guangdong (CN); Chao Chen, Guangdong (CN)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 118 days.

(21) Appl. No.: 15/234,900

(22) Filed: Aug. 11, 2016

(65) Prior Publication Data
US 2018/0046276 A1 Feb. 15, 2018

(51) Int. Cl.
G06F 3/041 (2006.01)
G06F 3/044 (2006.01)

(52) U.S. Cl.
CPC .................... G06F 3/044 (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 8,319,747 | B2 * | 11/2012 | Hotelling | G06F 3/044 345/173 |
| 9,081,453 | B2 * | 7/2015 | Bulea | G06F 3/044 |
| 9,081,457 | B2 * | 7/2015 | Solven | G06F 3/044 |
| 9,146,644 | B2 * | 9/2015 | Hershman | G06F 3/044 |

(Continued)

FOREIGN PATENT DOCUMENTS

| | | |
|---|---|---|
| CN | 202838286 U | 3/2013 |
| CN | 103793121 A | 5/2014 |

(Continued)

OTHER PUBLICATIONS

Summary of the Taiwanese 1st Office Action for TW104111714, dated Sep. 23, 2016.

(Continued)

*Primary Examiner* — Peter D McLoone
(74) *Attorney, Agent, or Firm* — U.S. Fairsky LLP; Yue (Robert) Xu

(57) ABSTRACT

An electronic apparatus and a single-layer multi-point mutual capacitive touch screen thereof are disclosed. The single-layer multi-point mutual capacitive touch screen includes: multiple sensing electrode groups, where each sensing electrode group includes a first electrode unit and a second electrode unit extending in the second direction, the first electrode unit includes multiple first electrodes arranged in the second direction, the second electrode unit includes at least one second electrode; multiple bonding pads arranged in the first direction, where first electrodes and second electrodes of the multiple sensing electrode groups are respectively connected to corresponding bonding pads; multiple first lines configured to connect the first electrodes to corresponding bonding pads; and multiple second lines configured to connect the second electrodes to corresponding bonding pads, where for a same first electrode unit, a first electrode is partially arranged opposite to an adjacent electrode in the first direction.

25 Claims, 20 Drawing Sheets

(56) References Cited

U.S. PATENT DOCUMENTS

| | | | |
|---|---|---|---|
| 9,182,861 B2* | 11/2015 | Bulea | G06F 3/044 |
| 9,483,151 B2* | 11/2016 | Solven | G06F 3/044 |
| 9,817,533 B2* | 11/2017 | Bulea | G06F 3/044 |
| 9,841,853 B2* | 12/2017 | Pai | G06F 3/0416 |
| 2010/0090979 A1* | 4/2010 | Bae | G06F 3/0416 345/174 |
| 2010/0149108 A1* | 6/2010 | Hotelling | G06F 3/044 345/173 |
| 2010/0258360 A1* | 10/2010 | Yilmaz | G06F 3/044 178/18.06 |
| 2011/0048812 A1* | 3/2011 | Yilmaz | G06F 3/044 178/18.06 |
| 2011/0048813 A1* | 3/2011 | Yilmaz | G06F 3/044 178/18.06 |
| 2011/0242027 A1* | 10/2011 | Chang | G06F 3/0412 345/173 |
| 2011/0273391 A1* | 11/2011 | Bae | G06F 3/0416 345/173 |
| 2012/0262419 A1* | 10/2012 | Hershman | G06F 3/044 345/174 |
| 2013/0181942 A1* | 7/2013 | Bulea | G06F 3/044 345/174 |
| 2014/0240616 A1* | 8/2014 | Huang | G06F 1/1692 349/12 |
| 2014/0247401 A1 | 9/2014 | Lee et al. | |
| 2014/0340354 A1 | 11/2014 | Liu | |
| 2015/0116254 A1* | 4/2015 | Solven | G06F 3/044 345/174 |
| 2016/0018926 A1* | 1/2016 | Nam | G06F 3/044 345/174 |
| 2017/0060304 A1* | 3/2017 | Hou | G06F 3/044 |

FOREIGN PATENT DOCUMENTS

| | | |
|---|---|---|
| CN | 203799362 U | 8/2014 |
| CN | 203812224 U | 9/2014 |
| CN | 203858615 U | 10/2014 |
| CN | 104169850 A | 11/2014 |
| CN | 204557444 U | 8/2015 |
| TW | 201415325 A | 4/2014 |
| TW | 201435457 A | 9/2014 |
| TW | 201443753 A | 11/2014 |

OTHER PUBLICATIONS

Translation of the Chinese 1st Office Action for CN201510070228.2, dated Jun. 30, 2017.

* cited by examiner

ELECTRONIC APPARATUS AND SINGLE-LAYER MULTI-POINT MUTUAL CAPACITIVE TOUCH SCREEN THEREOF

FIELD

The disclosure relates to the field of touch technology, and particularly to an electronic apparatus and a single-layer multi-point mutual capacitive touch screen thereof.

BACKGROUND

Currently, capacitive touch screens, as important components for human-machine interaction, have been widely used in electronic products such as cell phones and tablet computer. A single-layer touch screen has a low cost and a high price/performance ratio since only one layer of electrodes needs to be fabricated, and thus receives broad attention and became an important develop direction of capacitive touch screens.

FIG. 1 shows an electrode pattern of a conventional single-layer mutual capacitive touch screen, which includes 4 first electrodes X1 to X4 parallelly arranged in the X direction, each first electrode is coupled to 15 second electrodes Y1 to Y15 sequentially arranged in the Y direction which forms multiple capacitive sensing nodes 12. Each first electrode is connected to a respective bonding pad 13 through a respective first line 14, and each second electrode is connected to a respective bonding pad 13 through a respective second line 15. The bonding pad 13 is connected to a flexible printed circuit board (FPC), not shown in the drawings, and the FPC is connected to a touch chip (not shown in the drawings). The touch chip is configured to detect Touch position information of a user is determined by detecting capacitance variations of the capacitive sensing nodes 12 by the touch chip. The bonding pad 13 is arranged within a binding region 11. The first line 14 and the second line 15 are lines of the single-layer mutual capacitive touch screen.

For a single-layer mutual capacitive touch screen with a set dimension, the electrode pattern with the arrangement shown in FIG. 1 causes a wide line dead region L0 of the single-layer mutual capacitive touch screen thereby causing a poor touch accuracy. In addition, the electrode pattern with the arrangement shown in FIG. 1 causes a large number of bonding pads and lines of the single-layer mutual capacitive touch screen thereby causing a high fabrication cost.

SUMMARY

In order to address the above problem, an electronic apparatus and a single-layer multi-point mutual capacitive touch screen thereof are provided according to the disclosure, which improves the touch accuracy of the single-layer multi-point mutual capacitive touch screen and reduces the fabrication cost.

To achieve the above object, a single-layer multi-point mutual capacitive touch screen is provided according to the disclosure, which includes:

m sensing electrode groups arranged along a first direction, where m is a positive integer greater than 1, each of the m sensing electrode groups includes a first electrode unit extending in a second direction and a second electrode unit extending in the second direction, the first electrode unit and the second electrode unit are arranged opposite to each other in the first direction, the second direction is perpendicular to the first direction, the first electrode unit includes first to n-th first electrodes along the second direction, where n is a positive integer greater than 1, and the second electrode unit includes multiple second electrodes;

multiple bonding pads arranged along the first direction, where the multiple bonding pads are disposed at a first end of the m sensing electrode groups, first electrodes and second electrodes of the m sensing electrode groups are respectively connected to corresponding bonding pads;

multiple first lines configured to connect the first electrodes to the bonding pads corresponding to the first electrodes; and multiple second lines configured to connect the second electrodes to the bonding pads corresponding to the second electrodes, where the first electrodes are configured to function as touch sensing electrodes and the second electrodes are configured to function as touch driving electrodes, or the first electrodes are configured to function as touch driving electrodes and the second electrodes are configured to function as touch sensing electrodes, and for a same first electrode unit, a first electrode is partially arranged opposite to an adjacent first electrode in the first direction.

Preferably, in the above single-layer multi-point mutual capacitive touch screen, the second electrode unit includes first second electrode to k-th second electrode arranged along the second direction, where k is a positive integer greater than 1;

for an i-th second electrode, in the first direction, the i-th second electrode is partially arranged opposite to an i-th first electrode and partially arranged opposite to an i+1th first electrode, where i is a positive integer smaller than k.

Preferably, in the above single-layer multi-point mutual capacitive touch screen, in a same second electrode unit, for at least part of the k second electrodes, each second electrode is arranged opposite to an adjacent second electrode in the first direction.

Preferably, in the above single-layer multi-point mutual capacitive touch screen, in a same sensing electrode group, in the first direction, in a case that k=n−1, a k-th second electrode is partially arranged opposite to a (n−1)th first electrode and partially arranged opposite to a n-th first electrode; and in a case that k=n, an entire k-th second electrode is arranged opposite to a portion of the n-th first electrode.

Preferably, in the above single-layer multi-point mutual capacitive touch screen, the first end is in proximity to first ones of first electrodes of the m sensing electrode groups.

Preferably, in the above single-layer multi-point mutual capacitive touch screen, every two of the multiple first lines does not intersect with each other, every two the of the multiple second lines does not intersect with each other, and each of the multiple first lines and each of the multiple second lines does not intersect with each other.

Preferably, in the above single-layer multi-point mutual capacitive touch screen, m is an even number, and in every two adjacent sensing electrode groups of the m sensing electrode groups, the first electrode unit of one sensing electrode group is adjacent to the first electrode unit of the other sensing electrode group, or the second electrode unit of one sensing electrode group is adjacent to the second electrode unit of the other sensing electrode group, where every two adjacent sensing electrode groups are arranged in mirror symmetry.

Preferably, in the above single-layer multi-point mutual capacitive touch screen, in two adjacent sensing electrode groups in which the first electrode unit of one sensing electrode group is adjacent to the first electrode unit of the other sensing electrode group, last ones of first electrodes of two first electrode units of the two adjacent sensing electrode groups are connected to a same bonding pad through a same first line; and the other first electrodes of the two first electrode units of the two adjacent sensing electrode groups are connected to corresponding bonding pads through respective first lines, where all first lines corresponding to first electrodes of the two adjacent sensing electrode groups are connected from the first electrodes to corresponding bonding pads along a direction opposite to the second direction.

Preferably, in the above single-layer multi-point mutual capacitive touch screen, in two adjacent sensing electrode groups in which the second electrode unit of one sensing electrode group is adjacent to the second electrode unit of the other sensing electrode group, second electrodes of two second electrode units of the two adjacent sensing electrode groups are connected to corresponding bonding pads through respective second lines, where all second lines corresponding to second electrodes of the two adjacent sensing electrode groups are connected from the second electrodes to corresponding bonding pads along a direction opposite to the second direction.

Preferably, in the above single-layer multi-point mutual capacitive touch screen, in two adjacent sensing electrode groups in which the first electrode unit of one sensing electrode group is adjacent to the first electrode unit of the other sensing electrode group, each of two first electrode units includes a first part of first electrodes and a second part of first electrodes along the second direction;

along the second direction, last ones of first electrodes of two first parts are connected to a corresponding bonding pad through a same first line, and the other first electrodes of the two first parts are connected to corresponding bonding pads through respective first lines, where first lines corresponding to first electrodes of the two first parts are connected from the first electrodes to corresponding bonding pads along a direction opposite to the second direction; and along the second direction, first ones of first electrodes of two second parts are connected to a corresponding binding pad through a same first line, and the other first electrodes of the two second parts are connected to corresponding bonding pads through respective first lines, where the first lines corresponding to first electrodes of the two second parts are connected, along the second direction, from the first electrodes to via holes disposed at a second end of the m sensing electrode groups, and are connected to the corresponding bonding pads through jumper wires connected to the via holes, where the second end is arranged opposite to the first end, and the jumper wires are connected to respective bonding pads.

Preferably, in the above single-layer multi-point mutual capacitive touch screen, the first lines corresponding to the first electrodes of the two first parts are connected to corresponding via holes disposed at the first end, and are connected to the corresponding bonding pads through jumper wires connected to the via holes.

Preferably, in the above single-layer multi-point mutual capacitive touch screen, in the two adjacent sensing electrode groups, for the first electrodes connected to corresponding bonding pads through jumper wires and via holes, along the second direction, first lines of two first electrodes having a same position in an order of first electrodes are connected to a corresponding bonding pad through a same jumper wire, where the first lines are connected to the jumper wire through a via hole.

Preferably, in the above single-layer multi-point mutual capacitive touch screen, in the two adjacent sensing electrode groups in which the second electrode unit of one sensing electrode group is adjacent to the second electrode unit of the other sensing electrode group, each of two second electrode units include a first part of second electrodes and a second part of second electrodes along the second direction;

second electrodes of two first parts are connected to corresponding bonding pads through respective second lines, where second lines corresponding to second electrodes of the two first parts are connected from the second electrodes to corresponding bonding pads along a direction opposite to the second direction; and second electrodes of two second parts are connected to corresponding bonding pads through respective second lines, where second lines corresponding to second electrodes of the two second parts are connected from the second electrodes to via holes disposed at the second end of the m sensing electrode groups along the second direction, and are connected to the corresponding bonding pads through jumper wires connected to the via holes, where the second end is arranged opposite to the first end, and the jumper wires are connected to respective bonding pads.

Preferably, in the above single-layer multi-point mutual capacitive touch screen, the second lines corresponding to the second electrodes of the two first parts are connected to corresponding via holes disposed at the first end, and are connected to the corresponding bonding pads through jumper wires connected to the via holes.

Preferably, in the above single-layer multi-point mutual capacitive touch screen, in the two adjacent sensing electrode groups, for the second electrodes connected to corresponding bonding pads through jumper wires and via holes, odd-numbered second electrodes are connected to a same jumper wire, and even-numbered second electrodes are connected to a same jumper wire.

Preferably, in the above single-layer multi-point mutual capacitive touch screen, one of the first electrode unit and the second electrode unit is defined as a first type of electrode unit, and the other one of the first electrode unit and the second electrode unit is defined as a second type of electrode unit;

lines of electrodes of electrode units of the first type are connected to corresponding bonding pads along a direction opposite to the second direction; and lines of electrodes of electrode units of the second type are connected to corresponding via holes disposed at the second end of the m sensing electrode groups along the second direction, and are connected to corresponding bonding pads through jumper wires connected to the via holes, where the second end is arranged opposite to the first end, and the jumper wires are connected to respective bonding pads.

Preferably, in the above single-layer multi-point mutual capacitive touch screen, the lines of the electrodes of the electrode units of the first type are connected to via holes disposed at the first end, and are connected to the corresponding bonding pads through jumper wires connected to the via holes.

Preferably, in the above single-layer multi-point mutual capacitive touch screen, the first electrode includes: a first comb electrode and a second comb electrode which are partially arranged opposite to each other along the first direction, where each of the first comb electrode and the second comb electrode includes multiple first branch electrodes, where the multiple first branch electrodes of the first comb electrode extends in the first direction, the multiple first branch electrodes of the second comb electrode extends in the direction opposite to the first direction; the first comb electrode is electrically connected to the second comb electrode; and for the opposite portion of the first comb electrode and the opposite portion of the second comb electrode in the first direction, first branch electrodes of the first comb electrode have a one-to-one correspondence with first branch electrodes of the second comb electrode.

Preferably, in the above single-layer multi-point mutual capacitive touch screen, in a same first electrode unit, the first comb electrode and the second comb electrode of the first one of first electrodes have different lengths in the second direction, the first comb electrode and the second comb electrode of an n-th first electrode have different lengths in the second direction, and the first comb electrode and the second comb electrode of each of the other first electrodes have a same length in the second direction.

Preferably, in the above single-layer multi-point mutual capacitive touch screen, the second electrode includes multiple second branch electrodes, where the multiple second branch electrodes are arranged between the first comb electrode and the second comb electrode, and each of the multiple second branch electrodes includes a first branch element extending in the direction opposite to the first direction and a second branch element extending in the first direction, where the first branch element is arranged between and coupled with two corresponding first branch electrodes of the first comb electrode, and the second branch element is arranged between and coupled with two corresponding first branch electrodes of the second comb electrode.

Preferably, in the above single-layer multi-point mutual capacitive touch screen, for the first one of first electrodes in each first electrode unit, along the second direction, the first one of first branch electrodes of the first comb electrode is electrically connected to the first one of first branch electrodes of the second comb electrode.

Preferably, in the above single-layer multi-point mutual capacitive touch screen, for the n-th first electrode, along the second direction, the last one of first branch electrodes of the first comb electrode is electrically connected to the last one of first branch electrodes of the second comb electrode; and for a p-th first electrode, one of the multiple first branch electrodes of the first comb electrode is electrically connected to one of the multiple first branch electrode of the second comb electrode, and the two electrically connected first branch electrodes are arranged opposite to each other in the first direction, where p is a positive integer greater than 1 and less than n.

Preferably, in the above single-layer multi-point mutual capacitive touch screen, for a q-th first electrode, one of the multiple first branch electrodes of the first comb electrode is electrically connected to one of the multiple first branch electrodes of the second comb electrode, and the two electrically connected first branch electrodes are staggered in the first direction, where q is a positive integer greater than 1 and smaller than n.

Preferably, in the above single-layer multi-point mutual capacitive touch screen, the m sensing electrode groups have a same structure and are arranged in an array.

An electronic apparatus is further provided according to the disclosure, which includes the single-layer multi-point mutual capacitive touch screen according to any one of the above arrangements.

Preferably, the electronic apparatus further includes a flexible circuit board and a touch chip, where the touch chip is electrically connected to the single-layer multi-point mutual capacitive touch screen though the flexible circuit board, and the flexible circuit board is connected to the multiple bonding pads.

Preferably, in the above electronic apparatus, the electronic apparatus includes the touch chip, and the touch chip includes multiple pins and is configured to transmit a signal with the m sensing electrode groups through the multiple pins, and for each of the m sensing electrode groups, the n first electrodes are connected to respective pins of the touch chip; and along the second direction, odd-numbered second electrodes of the second electrode unit are connected to a same pin of the touch chip, and even-numbered second electrodes of the second electrode unit are connected to a same pin of the touch chip, where the odd-numbered second electrodes and the even-numbered second electrodes are connected to different pins.

Preferably, in the above electronic apparatus, for different sensing electrode groups, along the second direction, the first electrodes of first electrode units with respect to a same position in an order of first electrodes are connected to a same pin of the touch chip, and second electrodes of second electrode units with respect to a same position in an order of second electrodes are connected to different pins of the touch chip.

Preferably, in the above electronic apparatus, second electrodes of different sensing electrode groups may be connected to different pins of the touch chip.

As can be seen from the above description, the single-layer multi-point mutual capacitive touch screen according to the disclosure includes: m sensing electrode groups arranged in a first direction, where m is a positive integer greater than 1, each of the m sensing electrode groups includes a first electrode unit extending in a second direction and a second electrode unit extending in the second direction, the first electrode unit and the second electrode unit are arranged opposite to each other in the first direction, the second direction is perpendicular to the first direction, the first electrode unit includes first to n-th first electrodes arranged along the second direction, where n is a positive integer greater than 1, and the second electrode unit includes at least one second electrode; multiple bonding pads arranged along the first direction, where the multiple bonding pads are disposed at a first end of the m sensing electrode groups, first electrodes and second electrodes of the m sensing electrode groups are respectively connected to corresponding bonding pads; multiple first lines, where the multiple first lines are configured to connect the first electrodes to bonding pads corresponding to the first electrodes; and multiple second lines, where the multiple second lines are configured to connect the second electrodes to bonding pads corresponding to the second electrodes, where the first electrodes are configured to function as touch sensing electrodes and the second electrodes are configured to function as touch driving electrodes, or the first electrodes are configured to function as touch driving electrodes and the second electrodes are configured to function as touch sensing electrodes, and in a same first electrode unit, adjacent first electrodes are partially arranged opposite to each other in the first direction.

Two adjacent first electrodes of a same first electrode unit are partially arranged opposite to each other in the first direction, thus in the two adjacent first electrodes of a same first electrode unit, non-opposite portions of the two adjacent first electrodes in the first direction can form sensing nodes with corresponding second electrodes respectively, and opposite portions of the two adjacent first electrodes in the first direction can also form a sensing node with a corresponding second electrode, therefore the number of sensing nodes is increased and the touch accuracy is improved. According to the disclosure, the number of sensing nodes is increased by arranging opposite portions between two adjacent first electrodes, which can reduce the number of first electrodes and second electrodes, thus the number of lines and bonding pads are reduces, the width of the line dead region is reduced, while the fabrication cost is reduced and the touch accuracy is improved.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

It should be noted that, in the content below, the term "multiple" has a meaning of at least two.

Figure 2:
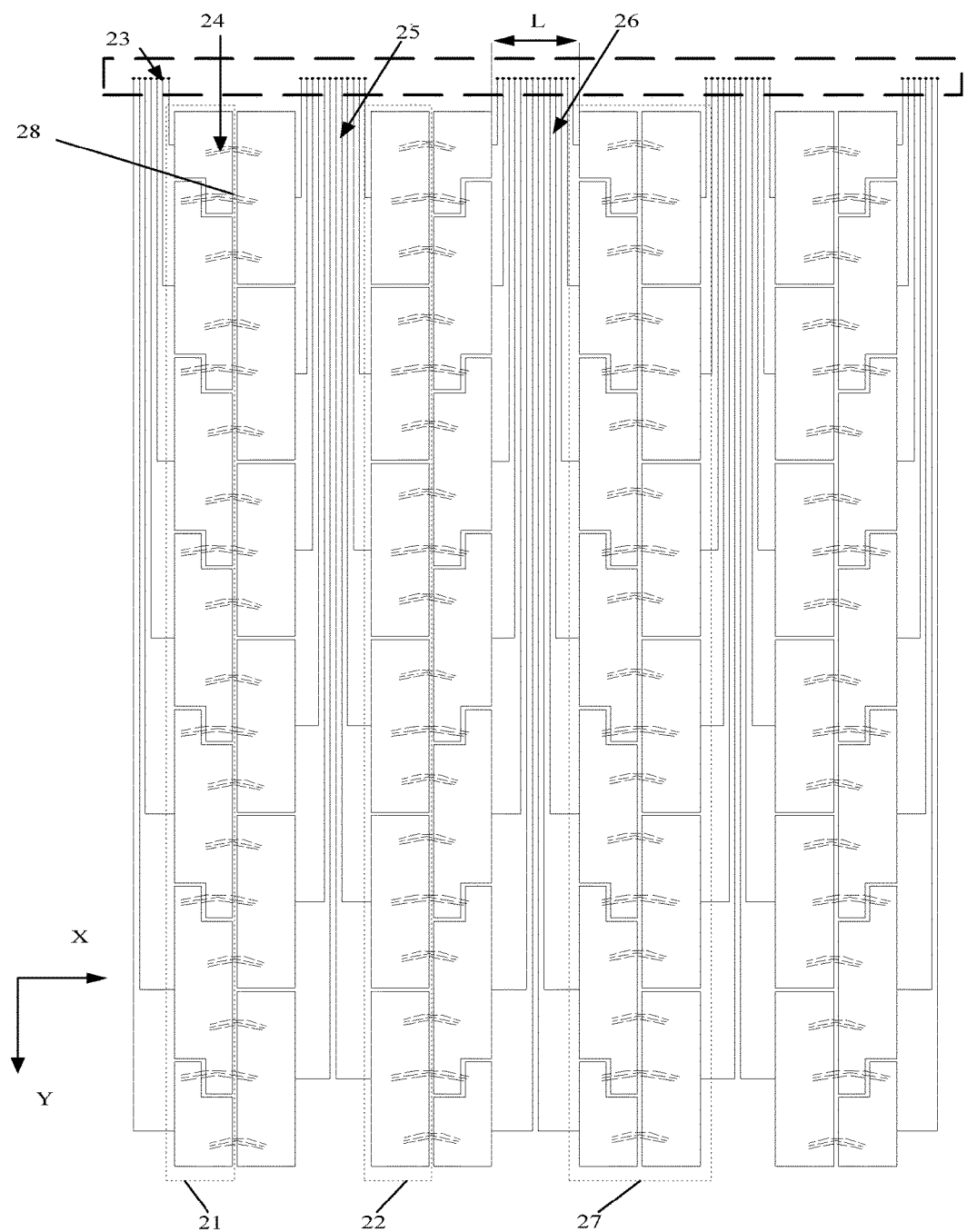
FIG. 2 is a schematic diagram showing a topological structure of a single-layer multi-point mutual capacitive touch screen according to an embodiment of the disclosure.

A single-layer multi-point mutual capacitive touch screen is provided according to an embodiment of the disclosure. Reference is made to FIG. 2, which is a schematic diagram showing a topological structure of a single-layer multi-point mutual capacitive touch screen according to an embodiment of the disclosure. The single-layer multi-point mutual capacitive touch screen includes multiple sensing electrode groups 27, multiple bonding pads 23, multiple first lines 26 and multiple second lines 25.

The multiple sensing electrode groups 27 includes first to m-th sensing electrode groups 27 arranged along a first direction (the direction of the X-axis), where m is a positive integer greater than 1. FIG. 2, in which m equal to 4 is taken as an example for illustration, shows a first sensing electrode group 27 to a fourth sensing electrode group 27.

Each of the sensing electrode groups 27 includes a first electrode unit 21 extending in a second direction (the direction of the Y-axis) and a second electrode unit 22 extending in the second direction, where the first electrode unit 21 and the second electrode unit 22 are oppositely arranged in the first direction to form capacitive sensing nodes 24 and 28. A capacitance variation of each capacitive sensing node 24 is detected with a touch chip (not shown in the drawings) to determine touch position information of a user. The second direction is perpendicular to the first direction.

The first electrode unit 21 includes n first electrodes arranged along the second direction, where n is a positive integer greater than 1. FIG. 2, in which n equal to 7 is taken as an example for illustration, shows first to seventh first electrodes. The second electrode unit 22 includes multiple second electrodes arranged in the second direction.

The multiple bonding pads 23 are arranged in the first direction and disposed at a first end of the m sensing electrode groups 27, where first electrodes and second electrodes of the m sensing electrode groups 27 are respectively connected to corresponding bonding pads 23. The first end is in proximity to a first one of the n first electrodes of the m sensing electrode groups 27. That is, as shown in FIG. 2, an upper end of the single-layer multi-point mutual capacitive touch screen is the first end, and a lower end of the single-layer multi-point mutual capacitive touch screen is the second end. A direction of a line connecting the first end and the second end is the second direction.

The first line 26 is configured to connect the first electrode to a corresponding bonding pad 23, and the second line 25 is configured to connect the second electrode to a corresponding bonding pad 23.

The first electrodes are configured to function as touch sensing electrodes and the second electrodes are configured to function as touch driving electrodes. Alternatively, the first electrodes are configured to function as touch driving electrodes and the second electrodes are configured to function as touch sensing electrodes. In a same first electrode unit 21, each first electrode is partially arranged opposite to an adjacent electrode in the first direction.

Since two adjacent first electrodes in a same first electrode unit 21 are partially arranged opposite to each other in the first direction, non-opposite portions of the two adjacent first electrodes in the first direction can form capacitive sensing nodes 24 with a corresponding second electrode. Each of the capacitive sensing nodes 24 include a single coupling capacitance between the first electrode and the second electrode, which is changed when the non-opposite portion is touched. Furthermore, the opposite portions of the two adjacent first electrodes in the first direction can also form a capacitive sensing node 28 with a corresponding second electrode. Each of the capacitive sensing node 28 includes a composite coupling capacitance of two coupling capacitances between the opposite portions of the two adjacent first electrodes and a same second electrode. The two coupling capacitances are changed simultaneously when the opposite portions are touched. Therefore, whether the capacitance sensing node 24 or the capacitance sensing node 28 is touched can be determined. Therefore, with the technical solution according to the disclosure, for a same physical dimension of the electrode, the number and types of the capacitive sensing nodes are increased, and the touch accuracy is improved.

According to the disclosure, the number of capacitive sensing nodes is increased by arranging opposite portions of first electrodes, which can reduce the number of first electrodes and second electrodes, such that the number of lines and bonding pads 23 is decreased, and the width of the line dead zone is reduced, while the touch accuracy is improved and the fabrication cost is reduced.

In FIG. 2, the second electrode unit 22 includes first to k-th second electrodes along the second direction, where k is a positive integer greater than 1. The i-th second electrode is partially arranged opposite to an i-th first electrode and is partially arranged opposite to an (i+1)-th first electrode in the first direction, where is a positive integer smaller than k. In a case that k is equal to n−1, a k-th second electrode is partially arranged opposite to an (n−1)-th first electrode and is partially arranged opposite to an n-th first electrode.

Figure 1:
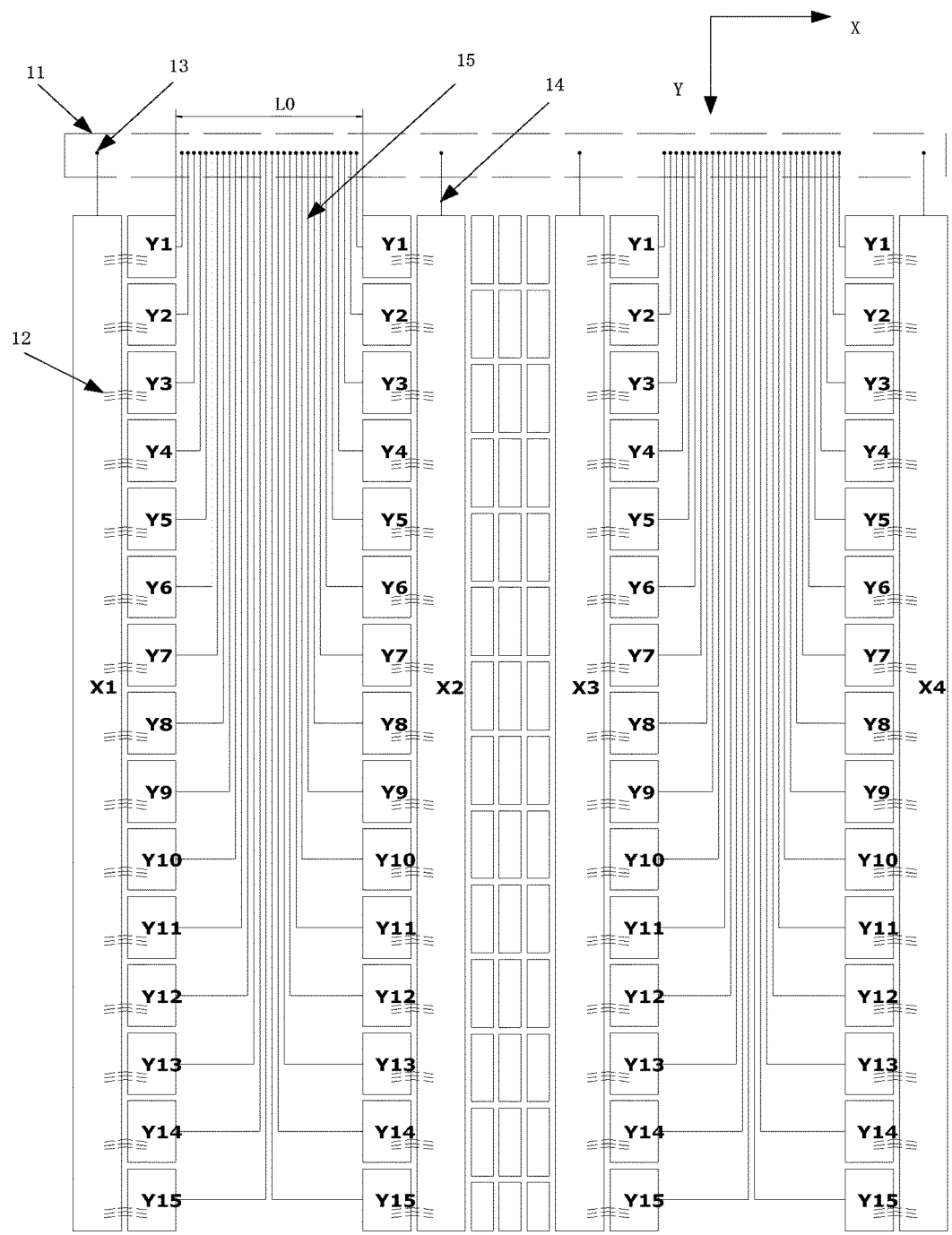
FIG. 1 is a schematic diagram showing a topological structure of a conventional single-layer mutual capacitive touch screen.

If a single-layer multi-point mutual capacitive touch screen with a length of 15 pitches is arranged as shown in FIG. 1, each of the second electrodes has a length of 1 pitch, each of the sensing electrode groups includes 1 first electrode and 15 second electrode, 15 capacitive sensing nodes 12 are formed, and 16 lines are required (1 first line 14 and 15 second lines 15). For all of the four sensing electrode groups, a total of 60 capacitive sensing nodes 12 are formed and 64 lines are required. In the disclosure, the length is a dimension along the second direction, and the pitch is a predetermined length value.

Figure 13:
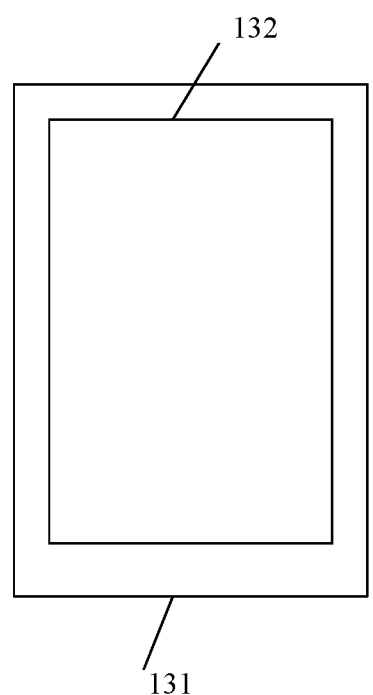
FIG. 13 is a schematic structural diagram of an electronic apparatus according to an embodiment of the disclosure.

If the single-layer multi-point mutual capacitive touch screen with a length of 15 pitches is arranged as shown in FIG. 2, it is arranged that each second electrode has a length of 2.5 Pitches, the first to seventh first electrodes each have a length of 1.5 Pitches, each of the second first electrode to the sixth first electrode has a length of 3 pitches, and opposite portions of two adjacent first electrodes in the first direction have a length of 0.5 pitches. In this case, the total length of the single-layer multi-point mutual capacitive touch screen is also 15 pitches. Each sensing electrode group 27 includes 7 first electrodes and 6 second electrodes, 18 capacitive sensing nodes are formed and 13 lines are required (7 first lines 26 and 6 second lines 25). For all of the four sensing electrode groups 27, a total of 72 capacitive sensing nodes 24 are formed and 52 lines are required. Thus, as compared to the conventional arrangement shown in FIG. 1, with the arrangement shown in FIG. 2, the number of capacitive sensing nodes is increased while the number of lines is decreased, thus the number of the bonding pads 23 is decreased and the width of the line dead region L is reduced. Therefore, the cost is reduced and the touch accuracy is improved. The width is a dimension along the first direction. Since the width of the line dead region is reduced, more sensing electrode groups 27 can be arranged in the single-layer multi-point mutual capacitive touch screen with a set width which further improves the touch accuracy. Alternatively, instead of arranging more sensing electrode groups 27, a width of a flexible printed circuit (FPC) to which the bonding pads 23 of the single-layer multi-point mutual capacitive touch screen shown in FIG. 2 is attached is correspondingly reduced, thereby reducing the fabrication cost of the FPC, thus the cost of an electronic apparatus 131 (as shown in FIG. 13) including the single-layer multi-point mutual capacitive touch screen and the FPC is reduced correspondingly.

It should be noted that, the sensing electrode groups 27 shown in FIG. 2 are arranged in mirror symmetry. The arrangement of the sensing electrode groups 27 is not limited to the mirror symmetry, alternatively, each of the sensing electrode groups 27 may have a same structure, and the sensing electrode groups 27 are arranged in an array. Preferably, the lines arranged between adjacent sensing electrode groups 27 have a same type, that is, lines between adjacent sensing electrode groups 27 may not include both the first line 26 and the second line 25, thus coupling interference is reduced.

Figure 3:
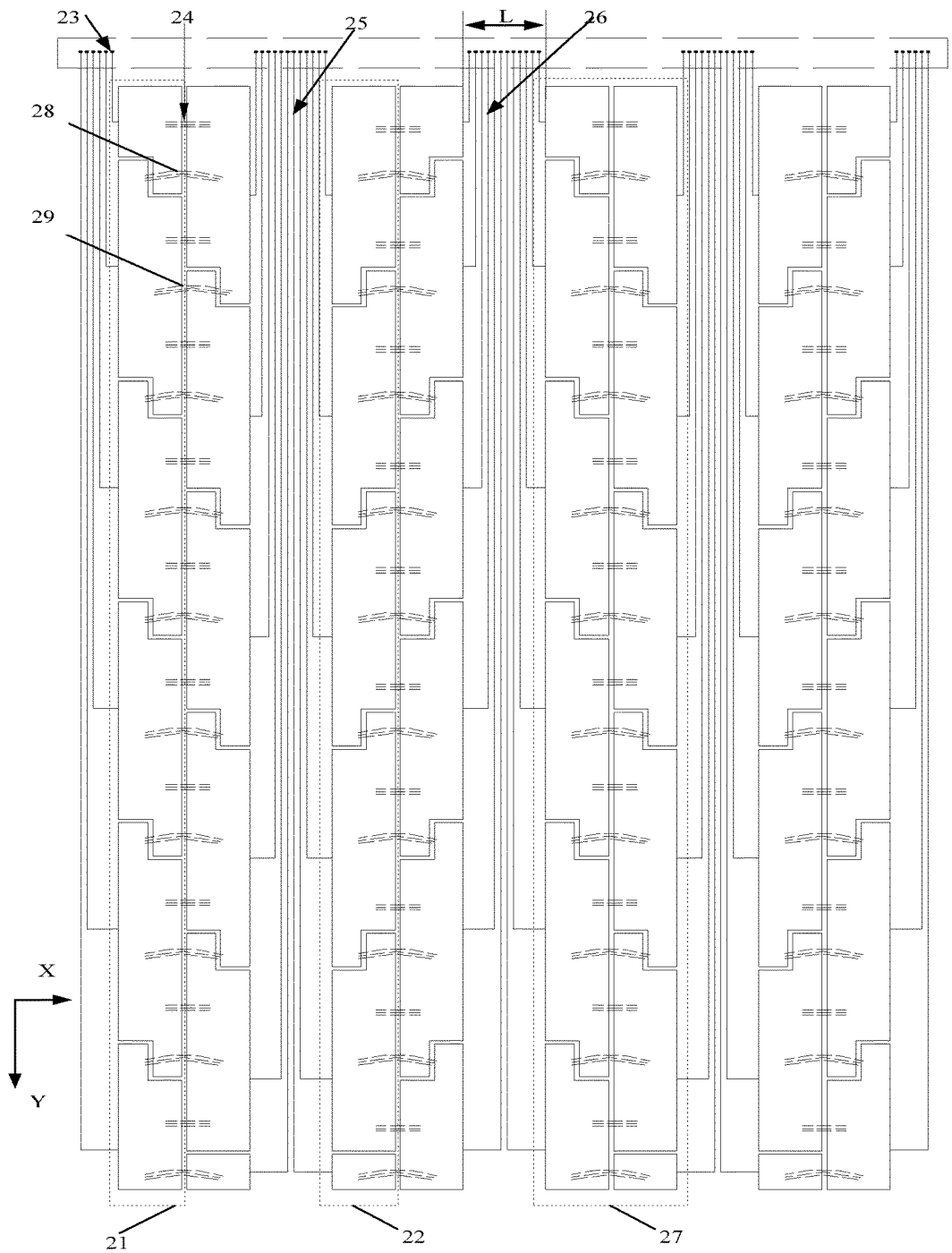
FIG. 3 is a schematic diagram showing a topological structure of a single-layer multi-point mutual capacitive touch screen according to another embodiment of the disclosure.

Reference is made to FIG. 3, which is a schematic diagram showing a topological structure of a single-layer multi-point mutual capacitive touch screen according to another embodiment of the disclosure. The single-layer multi-point mutual capacitive touch screen shown in FIG. 3 includes four sensing electrode groups 27, i.e., m=4, and the first electrode unit 21 includes 6 first electrodes, i.e., n=6. In this case, an entire k-th second electrode is arranged opposite to an n-th first electrode, where k is equal to n. In a same second electrode unit 22, for at least part of adjacent second electrodes of the k second electrodes, each second electrode is partially arranged opposite to an adjacent second electrode in the first direction. In a case that a last one of second electrodes of the second electrode unit along the second direction has a short length, the last second electrode may be not opposite to a second electrode adjacent thereto, as shown in FIG. 3.

It can be seen from FIG. 3, besides the coupling capacitance 24 between a single first electrode and a single second electrode and the composite coupling capacitance 28 between two adjacent first electrodes and a same second electrode shown in FIG. 2, a composite coupling capacitance 29 between two adjacent second electrodes and a same first electrode is further formed, thus the number and types of the capacitive sensing nodes are further increased while the physical dimension of the electrode remains the same.

With the arrangement shown in FIG. 3, in each of the sensing electrode groups 27, it is arranged that the first one of first electrodes and the last one of first electrodes each have a length of 1.5 pitches, each of the second first electrode to the fifth first electrode has a length of 3.5 pitches, and opposite portions of two adjacent first electrodes in the first direction have a length of 0.5 pitches; it is arranged that the last second electrode has a length of 0.5 pitches, and each of the second to fifth second electrode has a length of 3 pitches and it is arranged that opposite portions of two adjacent second electrodes along the first direction have a length of 0.5 pitches, and the total length of the single-layer multi-point mutual capacitive touch screen is also 15 pitches; and it is arranged that each of the sensing electrode groups 27 includes 6 first electrodes and 6 second electrodes, 20 capacitive sensing nodes are formed and 12 lines are required (6 first lines 26 and 6 second lines 25). For all of the four sensing electrode groups 27, a total of 80 capacitive sensing nodes are formed and 48 lines are required. Similarly, as compared to the conventional arrangement shown in FIG. 1, with the arrangement shown in FIG. 3, the number of capacitive sensing nodes is increased while the number of the first lines 26 and the second lines 25 are decreased, thus the number of the bonding pads 23 is decreased and the width of the line dead region L is reduced. Therefore, the cost is reduced and the touch accuracy is improved.

The length of opposite portions of two adjacent first electrodes in the first direction and the length of opposite portions of two adjacent second electrodes in the first direction may be arranged within a range of 0 pitch to 1.5 pitches according to dimension requirements.

In the embodiments of the disclosure, every two of the multiple first lines 26 do not intersect with each other, every two of the multiple second lines 25 do not intersect with each other, and each of the multiple first lines 26 does not intersect with each of the multiple second lines 25, such that the multiple first lines 26 and the multiple second lines 25 may be arranged in a same layer, thereby reducing fabrication difficulty and reducing the thickness of the touch screen.

Preferably, it is arranged that m is an even number, in every two adjacent sensing electrode groups 27, the first electrode unit 21 of one sensing electrode group 27 is adjacent to the first electrode unit 21 of the other sensing electrode group 27, or the second electrode unit 22 of one sensing electrode group 27 is adjacent to the second electrode unit 22 of the other sensing electrode group 27, where the two adjacent sensing electrode groups 27 are arranged in mirror symmetry, thereby improving linearity and accuracy of touch sensing.

In the embodiment, in two adjacent sensing electrode groups 27 in which the first electrode unit 21 of one sensing electrode group 27 is adjacent to the first electrode unit 21 of the other sensing electrode group 27, last ones of first electrodes of two first electrode units 21 of the two adjacent sensing electrode groups 27 are connected to a same bonding pad 23 through a same first line 26, and the first electrode to fifth electrode of the two first electrode units 21 of the two adjacent sensing electrode groups 27 are connected to corresponding bonding pads 23 through respective first lines 26, where the first lines 26 of the two adjacent sensing electrode groups 27 are connected from the first electrodes to corresponding bonding pads 23 along a direction opposite to the second direction.

In two adjacent sensing electrode groups 27 in which the second electrode unit 22 of one sensing electrode group 27 is adjacent to the second electrode unit 22 of the other sensing electrode group 27, second electrodes of two second electrode units 22 of the two adjacent sensing electrode groups 27 are connected to corresponding bonding pads 23 through respective second lines 25, where second lines 25 of the second electrodes of the two adjacent sensing electrode groups 27 are connected from respective second electrodes to corresponding bonding pads 23 along a direction opposite to the second direction.

The width of the line dead region may be further reduced, and the touch accuracy may be further improved by arranging jumper wires and via holes.

In the two adjacent sensing electrode groups 27 in which the first electrode unit 21 of one sensing electrode group 27 is adjacent to the first electrode unit 21 of the other sensing electrode group 27:

each of the two first electrode units 21 includes a first part of first electrodes and a second part of first electrodes along the second direction, where the number of first electrodes of the first part is the same as the number of first electrodes of the second part in a case that n is an even number, and the number of the first electrodes of the first part is smaller than the number of first electrodes of the second part by one in a case that n is an odd number, thus facilitating reducing the number of lines;

in the second direction, last ones of first electrodes of the two first parts are connected to a corresponding bonding pad 23 through a same first line 26 thereby further reducing the number of lines and avoiding an intersection between lines, and the other first electrodes of the two first parts are connected to corresponding bonding pads 23 through respective first lines 26, where the first lines 26 corresponding to first electrodes of the two first parts are connected from the first electrodes to corresponding bonding pads 23 along a direction opposite to the second direction; and along the second direction, first ones of first electrodes of the two second part are connected to a corresponding bonding pad 23 through a same first line 26 thereby further reducing the number of lines and avoiding an intersection between lines, and the other first electrodes of the two second parts are connected to corresponding bonding pads 23 through respective first lines 26, where the first lines 26 corresponding to the first electrodes of the two second part are connected from the first electrodes to via holes disposed at a second end of the m sensing electrode groups 27 in the second direction, and are connected to the corresponding bonding pads 23 through jumper wires connected to the via holes, where the second end is arranged oppositely to the first end, and the jumper wires are connected to respective bonding pads 23.

In the two adjacent sensing electrode groups 27 in which the second electrode unit 22 of one sensing electrode group 27 is adjacent to the second electrode unit 22 of the other sensing electrode group 27, each of the two second electrode units 22 includes a first part of second electrodes and a second part of second electrodes, where the number of second electrodes of the first part is the same as the number of second electrodes of the second part in a case that k is an even number, and the number of the second electrodes of the first part is smaller than the number of second electrodes of the second part by one in a case that k is an odd number;

second electrodes of two first parts are connected to corresponding bonding pads 23 through respective second lines 25, where second lines 25 corresponding to second electrodes of the two first parts are connected from the second electrodes to corresponding bonding pads 23 along a direction opposite to the second direction; and second electrodes of two second parts are connected to corresponding bonding pads 23 through respective second lines 25, where the second lines 25 corresponding to second electrodes of the two second parts are connected from the second electrodes to via holes disposed at the second end of the m sensing electrode groups 27 in the second direction, and tare connected to the corresponding bonding pads 23 through jumper wires connected to the via holes, where the second end is arranged oppositely to the first end, and the jumper wires are connected to respective bonding pads 23.

In the two adjacent sensing electrode groups 27, first lines 26 of two opposite first electrodes of two second parts in the first direction are connected to a corresponding bonding pad 23 through a same jumper wire, where the first lines are connected to the jumper wire through a via hole. In the two adjacent sensing electrode groups 27, for the second electrodes of the second part of a same second electrode unit 22, odd-numbered second electrodes are connected to a same jumper wire, and even-numbered second electrodes are connected to a same jumper wire, such that the number of lines is reduced, and the fabrication cost is reduced while it is ensured that that multiple-point touch detection can be performed.

It should be noted that, the sensing electrode groups 27 shown in FIG. 3 are arranged in mirror symmetry. The arrangement of the sensing electrode groups 27 is not limited to the mirror symmetry, alternatively, each of the sensing electrode groups 27 may have a same structure, and the sensing electrode groups 27 are arranged in an array. Preferably, the lines between adjacent sensing electrode groups 27 have a same type. That is, lines between adjacent sensing electrode groups 27 may not include both the first lines 26 and the second lines 25, thus coupling interference is reduced.

Figure 4A:
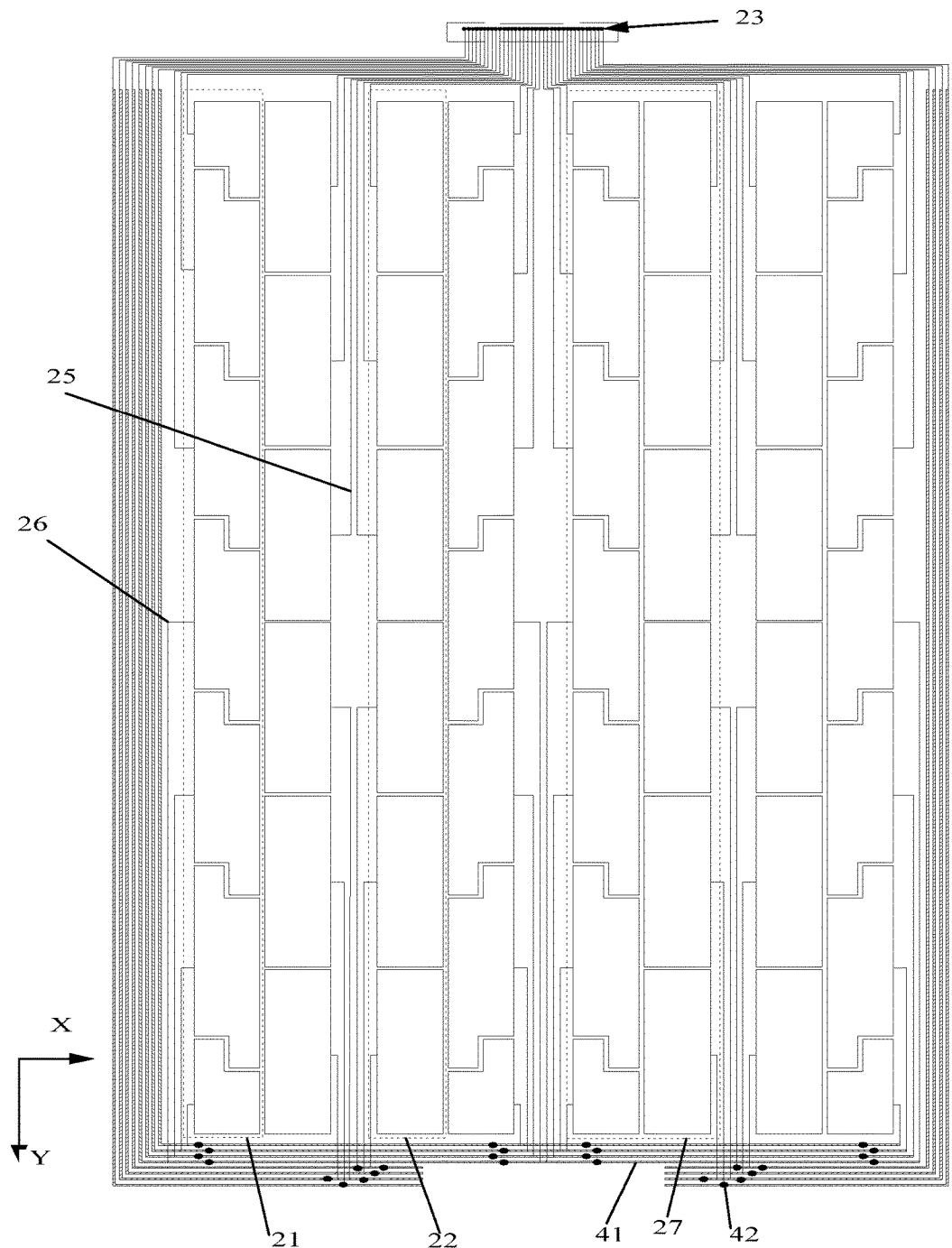
FIG. 4a is a schematic diagram showing a topological structure of a single-layer multi-point mutual capacitive touch screen according to another embodiment of the disclosure.

Reference is made to FIG. 4a, which is a schematic diagram showing a topological structure of a single-layer multi-point mutual capacitive touch screen according to another embodiment of the disclosure. In the embodiment shown in FIG. 4a, the width of the line dead region is further reduced based on the above arrangement of jumper wires and via holes. The single-layer multi-point mutual capacitive touch screen includes a display area and a frame area surrounding the display area. Sensing electrode groups 27 are disposed in the display area. Bonding pads 23 are disposed at a first end of the single-layer multi-point mutual capacitive touch screen. Start ends of jumper wires 41 are arranged at a second end of the single-layer multi-point mutual capacitive touch screen, and are connected to corresponding bonding pads 23 through the frame area on the left side or the right side of the single-layer multi-point mutual capacitive touch screen. The jumper wires 41 are located above a metal layer where the first lines 26 and the second lines 25 are located, and an insulation layer is disposed between the jumper wires 41 and the metal layer. The jumper wires 41 are electrically connected with corresponding lines through via holes 42 to facilitate an electrical connection between the lines and corresponding bonding pads 23. bonding pad In FIG. 4a, it is arranged that a second electrode unit of a first sensing electrode group 27 is adjacent to a second electrode unit of a second sensing electrode group 27, and a first electrode unit of the second sensing electrode group 27 is adjacent to a first electrode unit of the third sensing electrode group 27. As described above, the first electrode unit 21 and the second electrode unit 22 of each sensing electrode group 27 each include a first part and a second part. In a case that m=4, n=7 and k=6, for each of the first electrode units 21, the first part includes the first to third first electrodes, and the second part includes the fourth to seventh first electrodes, and for each of the second electrode units 22, the first part includes the first to third second electrodes, and the second part includes the fourth to sixth second electrodes.

For the second sensing electrode group 27 and the third sensing electrode group 27, in the first parts of the first electrode units, the first to the third first electrode are connected to corresponding bonding pad 23 with respective first line 26, where the first lines 26 corresponding to first electrodes of two first part are connected from the first electrodes to corresponding bonding pads 23 along a direction opposite to the second direction, preferably, third first electrodes of the two first parts may be connected to a corresponding bonding pad 23 through a same first line 26 thereby reducing the number of lines while avoiding an intersection between lines;

in second parts of the first electrode units, the fourth to the seventh first electrodes are connected to corresponding bonding pads 23 with respective first lines 26, where the first lines 26 corresponding to the first electrodes of the second parts are connected from the first electrodes to via holes 42 disposed at the second end along the second direction, and are connected to the corresponding bonding pads 23 through jumper wires 41 connected to the via holes 42, where the jumper wires 41 are connected to respective bonding pads 23, preferably, fourth first electrodes of the two first parts may be connected to a corresponding bonding pad 23 through a same first line 26 thereby reducing the number of lines while avoiding an intersection between lines;

for the first electrodes of two second parts of the two first electrode units, first lines 26 corresponding to two opposite first electrodes in the first direction are connected to a corresponding bonding pad 23 through a same jumper wire, where the first lines are connected to the jumper wire through a via hole 42, thereby reducing the number of bonding pads 23 and jumper wires 41 while achieving touch detection. Specifically, two fourth first electrodes are connected to a same jumper wire 41 disposed at the second end through respective first lines 26 so as to be connected to a same bonding pad 23 through the jumper wire 41; two fifth first electrodes are connected to a same jumper wire 41 disposed at the second end through respective first lines 26 so as to be connected to a same bonding pad 23 through the jumper wire 41, two sixth first electrodes are connected to a same jumper wire 41 disposed at the second end through respective first lines 26 so as to be connected to a same bonding pad 23 through the jumper wire 41, and two seventh first electrodes are connected to a same jumper wire 41 disposed at the second end through respective first lines 26 so as to be connected to a same bonding pad 23 through the jumper wire 41.

In the first sensing electrode group 27 and the second sensing electrode group 27, in two first parts of the two second electrode units, the first to the third second electrodes are connected to corresponding bonding pads 23 with respective second lines 25, where the second lines 25 corresponding to the second electrodes of two first parts are connected from the second electrodes to corresponding bonding pads 23 along a direction opposite to the second direction, in two second parts of the two second electrode units, the fourth to the sixth second electrodes are connected to corresponding bonding pads 23 with respective first lines 25, where the second lines 25 corresponding to second electrodes of the two second part are connected from the second electrodes to via holes 42 disposed at the second end along the second direction, and are connected to the corresponding bonding pads 23 through jumper wires 41 connected to the via holes 42, for the second electrodes of the two second parts, in the second part of a same second electrode unit 22, odd-numbered second electrodes are connected to a same jumper wire 41, and even-numbered second electrodes are connected to a same jumper wire 41, specifically, the fourth and the sixth second electrodes of the first sensing electrode group 27 are connected to a same jumper wire 41, the fourth and the sixth second electrodes of the second sensing electrode group 27 are connected to a same jumper wire 41, and each of second electrodes of the second electrode unit 22 in the first sensing electrode group 27 is connected to a jumper wire 41 different from jumper wires 41 to which the second electrodes of the second electrode unit 22 in the second sensing electrode group 27 are connected.

Figure 4B:
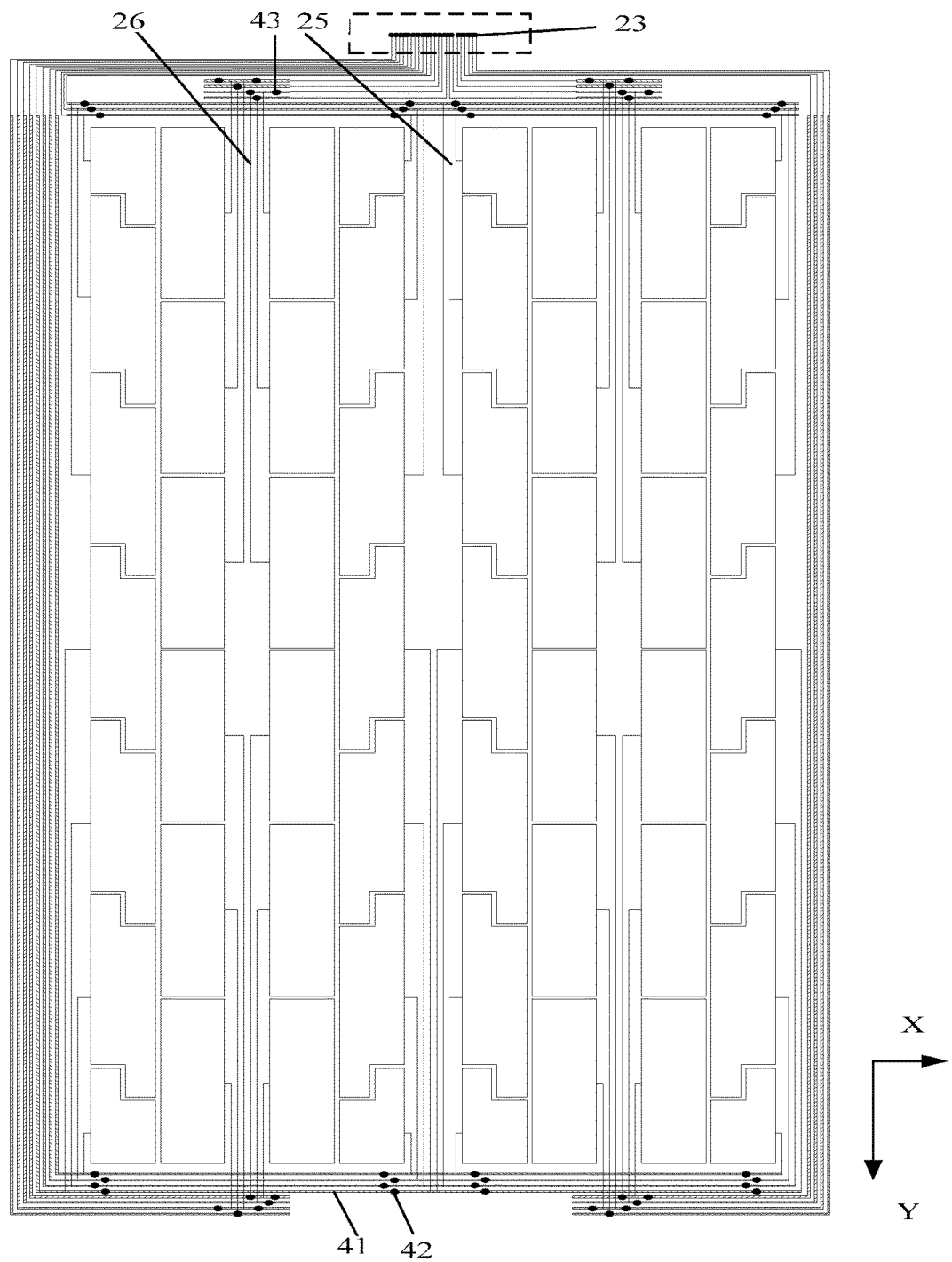
FIG. 4b is a schematic diagram showing a topological structure of a single-layer multi-point mutual capacitive touch screen according to another embodiment of the disclosure.

Reference is made to FIG. 4b, which is a schematic diagram showing a topological structure of a single-layer multi-point mutual capacitive touch screen according to another embodiment of the disclosure. On the basis of FIG. 4a, in FIG. 4b, first lines 26 corresponding to the first electrodes of the two first parts are connected to corresponding via holes 43 disposed at the first end, and are connected to the corresponding bonding pads 23 through jumper wires connected to the via holes 43, and second lines 25 corresponding to the second electrodes of the two first parts are connected to corresponding via holes 43 disposed at the first end, and are connected to the corresponding binding pads 23 through jumper wires connected to the via holes 43.

For the first electrodes connected to corresponding bonding pads 23 via jumper wires and via holes 43, first lines 25 corresponding to two opposite first electrodes of two first electrode units in the first direction are connected to a corresponding bonding pad 23 through a same jumper wire, where the first lines are connected to the jumper wire through a via hole 43. For the second electrodes connected to corresponding bonding pads 23 via jumper wires and via holes 43, odd-numbered second electrodes are connected to a same jumper wire, and even-numbered second electrodes are connected to a same jumper wire.

It is defined that one of the first electrode unit 21 and the second electrode unit 22 is a first type of electrode unit, and the other one is a second type of electrode unit. All lines of electrodes of electrode units of the first type are connected to corresponding bonding pads 23 along a direction opposite to the second direction, and all lines of electrodes of electrode units of the second type are connected to corresponding via holes 42 disposed at the second end of the m sensing electrode groups 27 along the second direction, and are connected to corresponding bonding pads 23 through jumper wires 41 connected to the via holes 42, where the second end is arranged oppositely to the first end, and jumper wires 41 are connected to respective bonding pads 23.

Figure 4C:
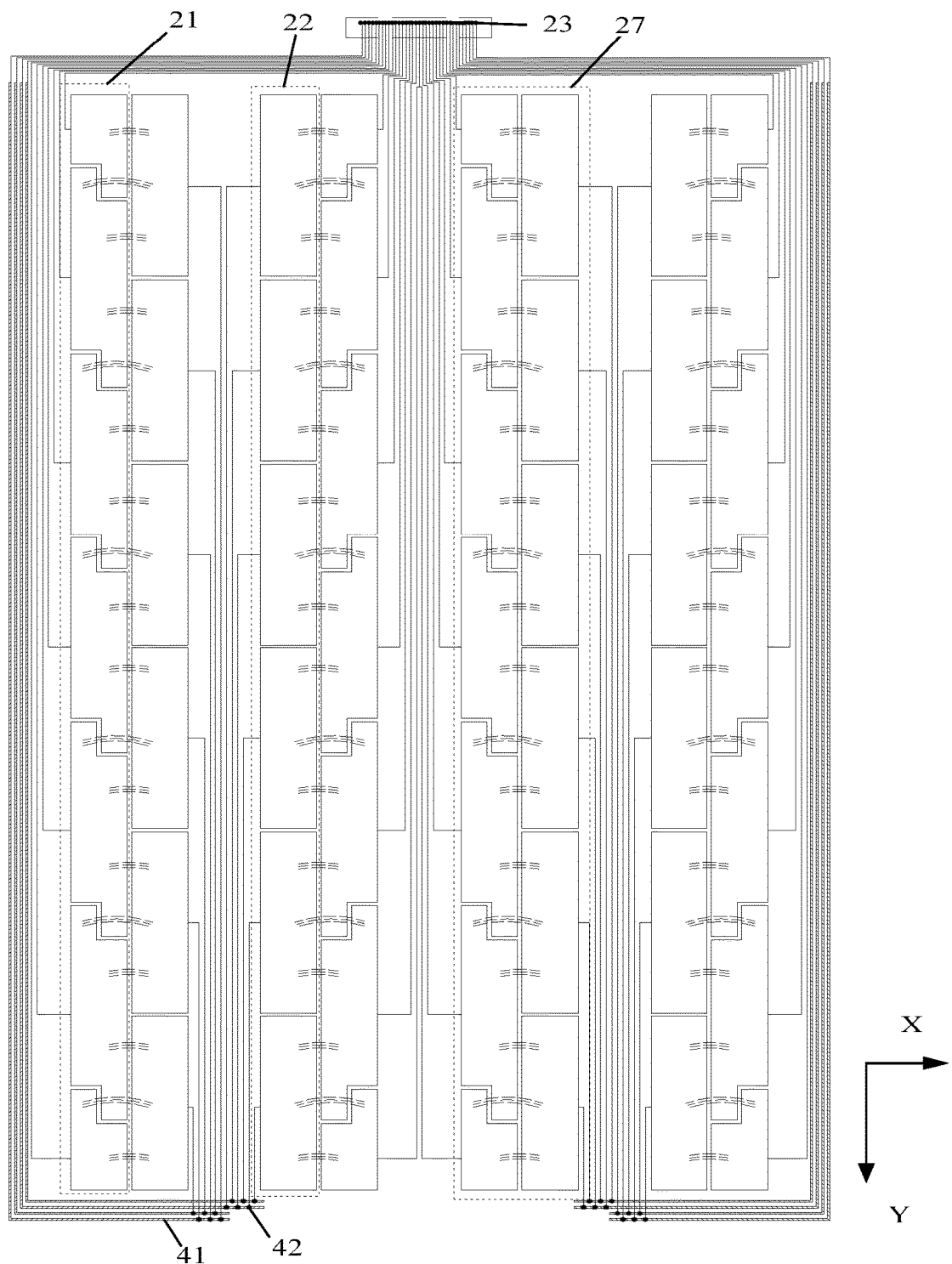
FIG. 4c is a schematic diagram showing a topological structure of a single-layer multi-point mutual capacitive touch screen according to another embodiment of the disclosure.

Reference is made to FIG. 4c, which is a schematic diagram showing a topological structure of a single-layer multi-point mutual capacitive touch screen according to another embodiment of the disclosure. In FIG. 4c, the first electrode unit 21 is defined as the first type of electrode unit, and the second electrode unit 22 is defined as the second type of electrode unit. Adjacent sensing electrode groups 27 are arranged in mirror symmetry. All lines of first electrode units 21 are connected to corresponding bonding pads 23 along a direction opposite to the second direction. All lines of second electrode units 22 are connected to corresponding via holes 42 disposed at the second end along the second direction, and are connected to corresponding bonding pads 23 through jumper wires 41 connected to the via holes 42.

Figure 4D:
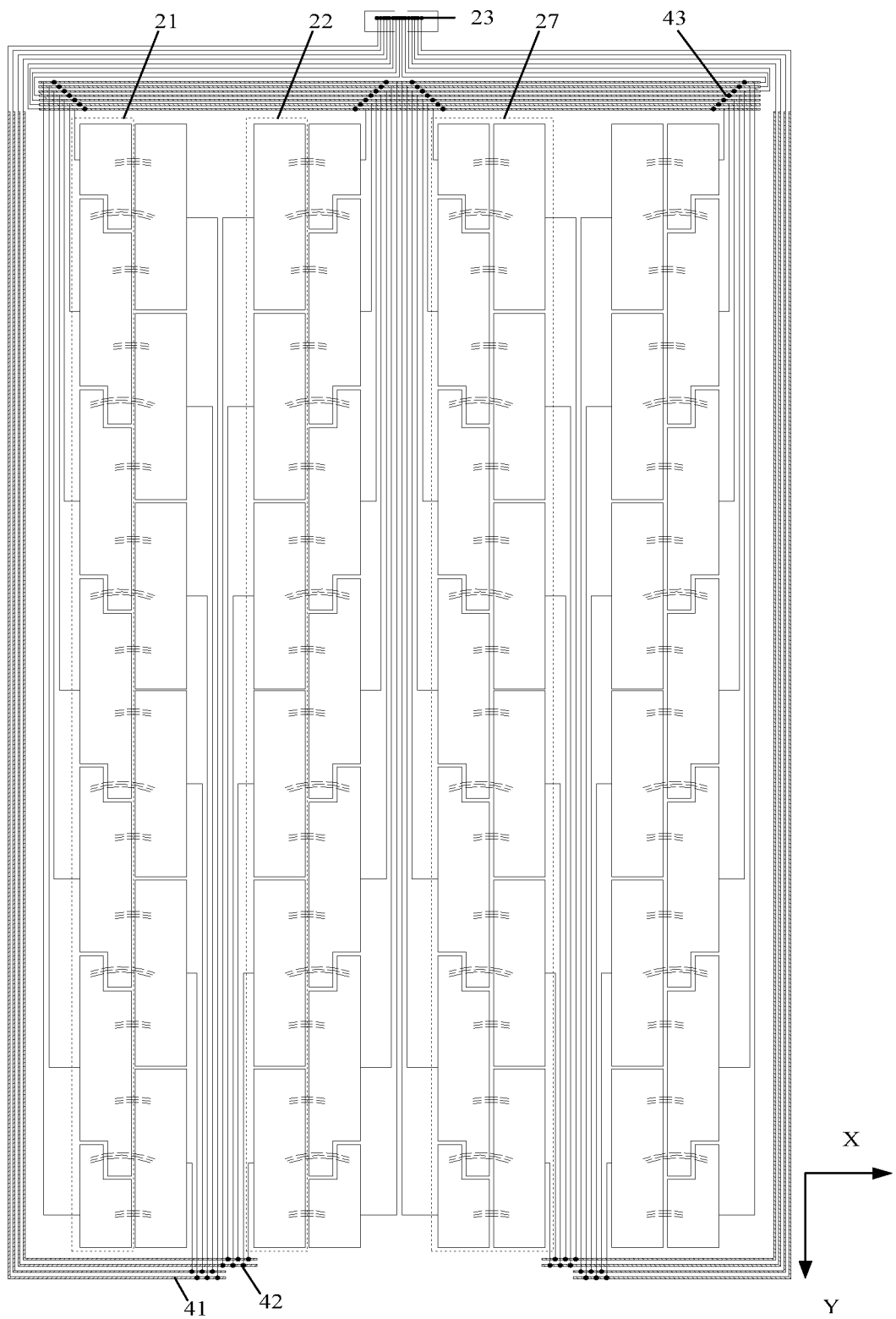
FIG. 4d is a schematic diagram showing a topological structure of a single-layer multi-point mutual capacitive touch screen according to another embodiment of the disclosure.

Reference is made to FIG. 4d, which is a schematic diagram showing a topological structure of a single-layer multi-point mutual capacitive touch screen according to another embodiment of the disclosure, lines of electrodes of electrode units of the first type are connected to corresponding via holes 43 disposed at the first end, and are connected to corresponding bonding pads 23 through jumper wires connected to the via holes 43.

In other embodiments, the first electrode unit 21 may be defined as the second type of electrode unit, and the second electrode unit 22 may be defined as the first type of electrode unit.

In the embodiments of the disclosure, a case that the first electrode unit 21 and the second electrode unit 22 of the first sensing electrode group 27 are arranged in sequence along the first direction is taken as an example. In other embodiments, the second electrode unit 22 and the first electrode unit 21 of the first sensing electrode group 27 may be arranged in sequence along the first direction.

In addition, in other embodiments, the arrangement of the sensing electrode groups 27 in each of FIGS. 4a to 4b is not limited to the mirror symmetry, alternatively, the sensing electrode groups 27 each having a same structure are arranged in an array.

Figure 5A:
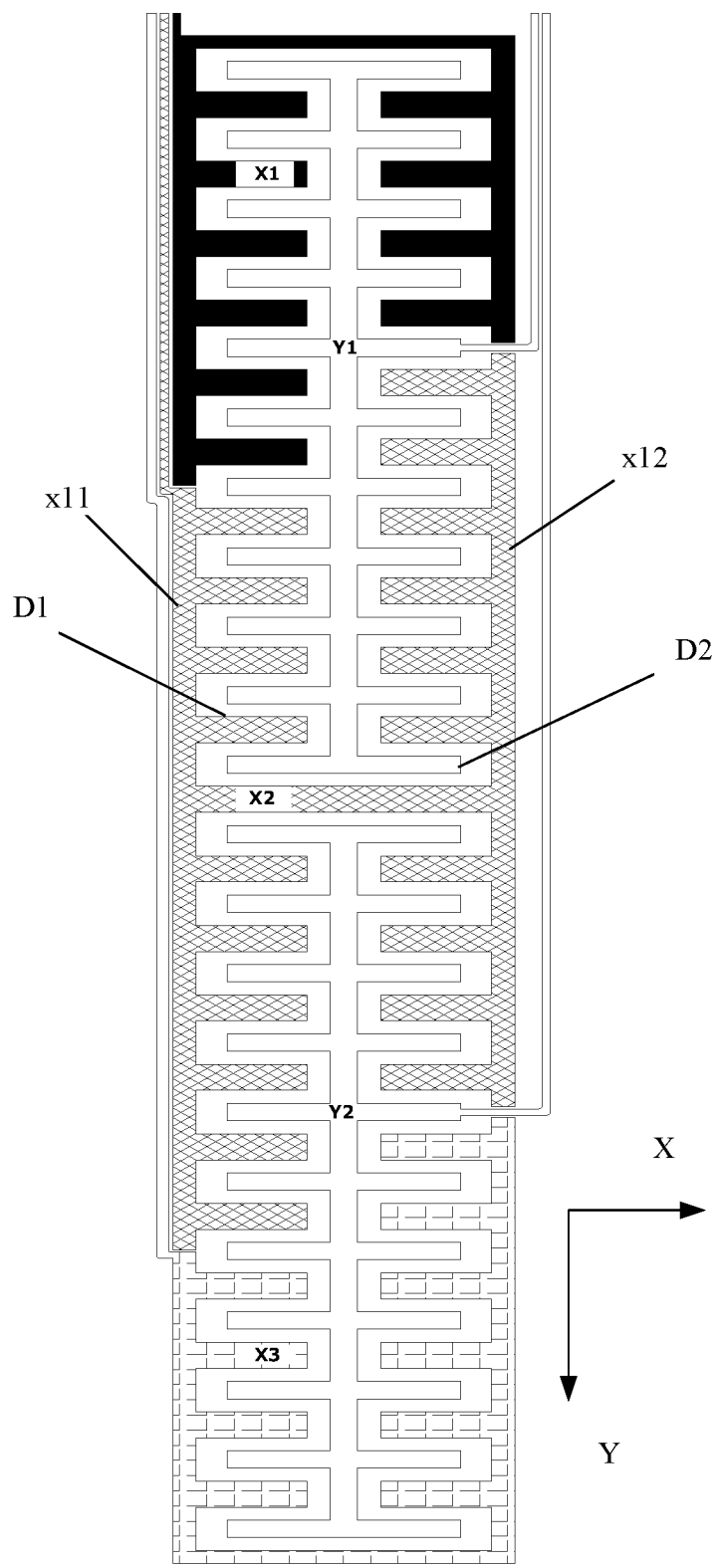
FIG. 5a is a schematic diagram showing a specific structure of one sensing electrode group of the single-layer multi-point mutual capacitive touch screen shown in FIG. 2 according to a preferable embodiment of the disclosure.

Reference is made to FIG. 5a, which is a schematic diagram showing a specific structure of one of the multiple sensing electrode groups 27 of the single-layer multi-point mutual capacitive touch screen shown in FIG. 2 according to a preferable embodiment of the disclosure. In the sensing electrode group shown in FIG. 5a, n=3, k=2, that is, the first electrode unit 21 of the sensing electrode group includes a first one of first electrodes X1, a second first electrode X2 and a third first electrode X3, and the second electrode unit 22 of the sensing electrode group includes a first second electrode Y1 and a second one of second electrodes Y2.

Each first electrode includes a first comb electrode x11 and a second comb electrode x12 which are partially arranged opposite to each other in the first direction.

At a first end of a sensing electrode group, a first comb electrode x11 of the first one of first electrodes X1 is flush with a second comb electrode x12 of the first one of first electrodes X1. At a second end of the sensing electrode group, a first comb electrode x11 of an n-th first electrode is flush with a second comb electrode x12 of the n-th first electrode.

Each of the first comb electrode x11 and the second comb electrode x12 includes multiple first branch electrodes D1, where the branch electrode D1 of the first comb electrode x11 extends in the first direction, and the first branch electrode D1 of the second comb electrode X12 extends in a direction opposite to the first direction. The first comb electrode x11 is electrically connected to the second comb electrode X12. For opposite portions of the first comb electrode x11 and the second comb electrode x12 in the first direction, first branch electrodes D1 of the first comb electrode x11 have a one-to-one correspondence with first branch electrodes D1 of the second comb electrode x12.

In a same first electrode unit 21, the first comb electrode x11 and the second comb electrode x12 of a first one of first electrodes have different lengths in the second direction, the first comb electrode x11 and the second comb electrode x12 of an n-th first electrode have different lengths in the second direction, and the first comb electrode x11 and the second comb electrode x12 of each of the other first electrodes have a same length in the second direction.

Each second electrode includes multiple second branch electrodes D2, where the multiple second branch electrodes D2 are arranged between the first comb electrodes x11 and the second comb electrodes x12, and each of the multiple second branch electrodes D2 includes a first branch element extending in a direction opposite to the first direction and a second branch element extending in the first direction, where the first branch element is arranged between and coupled with two corresponding first branch electrodes D1 of the first comb electrode x11, and the second branch element is arranged between and coupled with two corresponding first branch electrodes D1 of the second comb electrode x12.

For the first one of first electrodes X1, in the second direction, a first one of first branch electrodes D1 of the first comb electrode x11 is electrically connected to a first one of first branch electrodes D1 of the second comb electrode x12. Alternatively, for the first one of first electrodes, in the second direction, the first one of first branch electrodes D1 of the first comb electrode x11 is integrated with the first one of first branch electrodes D1 of the second comb electrode x12.

For an n-th first electrode, along the second direction, the last one of first branch electrodes D1 of the first comb electrode x11 is electrically connected to the last one of first branch electrodes D1 of the second comb electrode x12. For a p-th first electrode, one of the multiple first branch electrodes D1 of the first comb electrode x11 is electrically connected to one of the multiple first branch electrode D1 of the second comb electrode x12, and the two electrically connected first branch electrodes D1 are opposite in the first direction, where p is a positive integer greater than 1 and smaller than n. In the arrangement shown in FIG. 5a, n=3, and p=2.

Figure 6A:
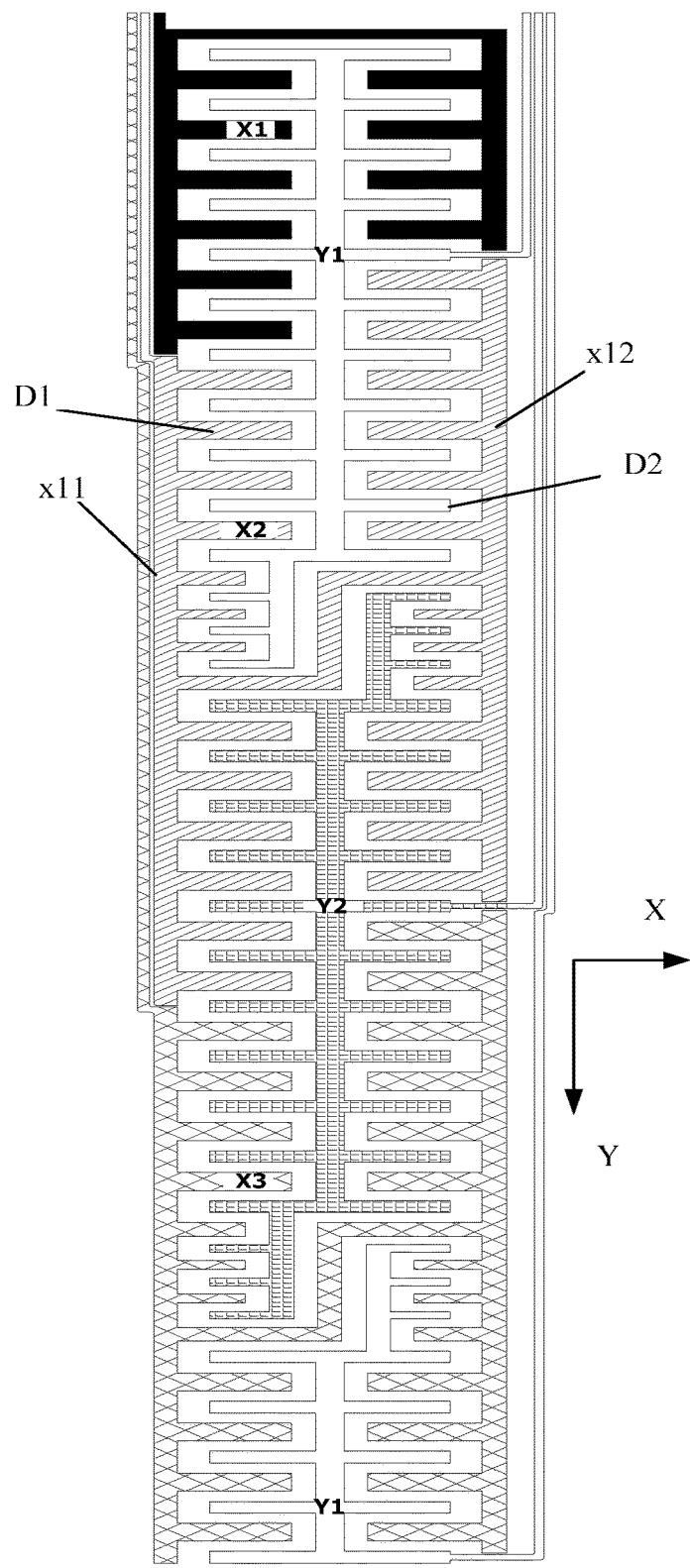
FIG. 6a is a schematic diagram showing a specific structure of one sensing electrode group of the single-layer multi-point mutual capacitive touch screen shown in FIG. 3 according to a preferable embodiment of the disclosure.

Reference is made to FIG. 6a, which is a schematic diagram showing a specific structure of one of the multiple sensing electrode groups of the single-layer multi-point mutual capacitive touch screen shown in FIG. 3 according to a preferable embodiment of the disclosure. In FIG. 6a, similarly, n=3, and k=2. The first comb electrode x11 and the second comb electrode x12 of a first one of first electrodes X1 of the sensing electrode group are connected in a same manner as the connection shown in FIG. 5a. For a q-th first electrode, one of the multiple first branch electrode D1 of the first comb electrode x11 is electrically connected to one of the multiple first branch electrode D1 of the second comb electrode x12, and the two electrically connected first branch electrodes D1 are staggered in the first direction, that is, the two electrically connected first branch electrodes D1 are not opposite to each other in the first direction, such that two adjacent second electrodes in a same second electrode unit are partially arranged opposite to each other in the first direction, where q is a positive integer greater than 1 and smaller than n. In the single-layer multi-point mutual capacitive touch screen shown in FIG. 6a, p is equal to 2 or 3.

For any one of the multiple sensing electrode groups 27, a direction of a connection line between the first electrode unit 21 and the second electrode unit 22 is the first direction or the direction opposite to the first direction.

Figure 5B:
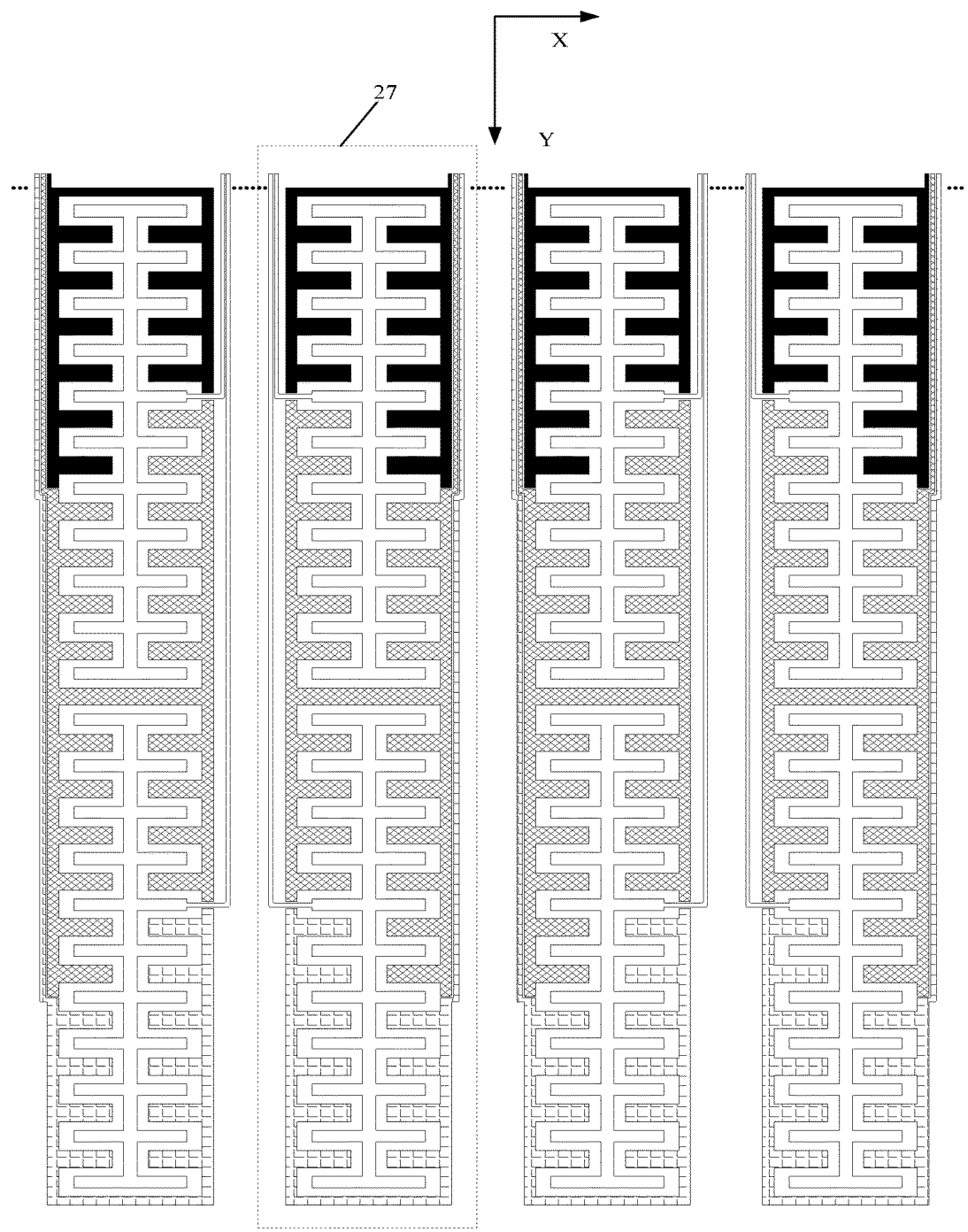
FIG. 5b is a schematic diagram showing a specific structure of the multiple sensing electrode groups of the single-layer multi-point mutual capacitive touch screen shown in FIG. 2 according to a preferable embodiment of the disclosure.
Figure 5C:
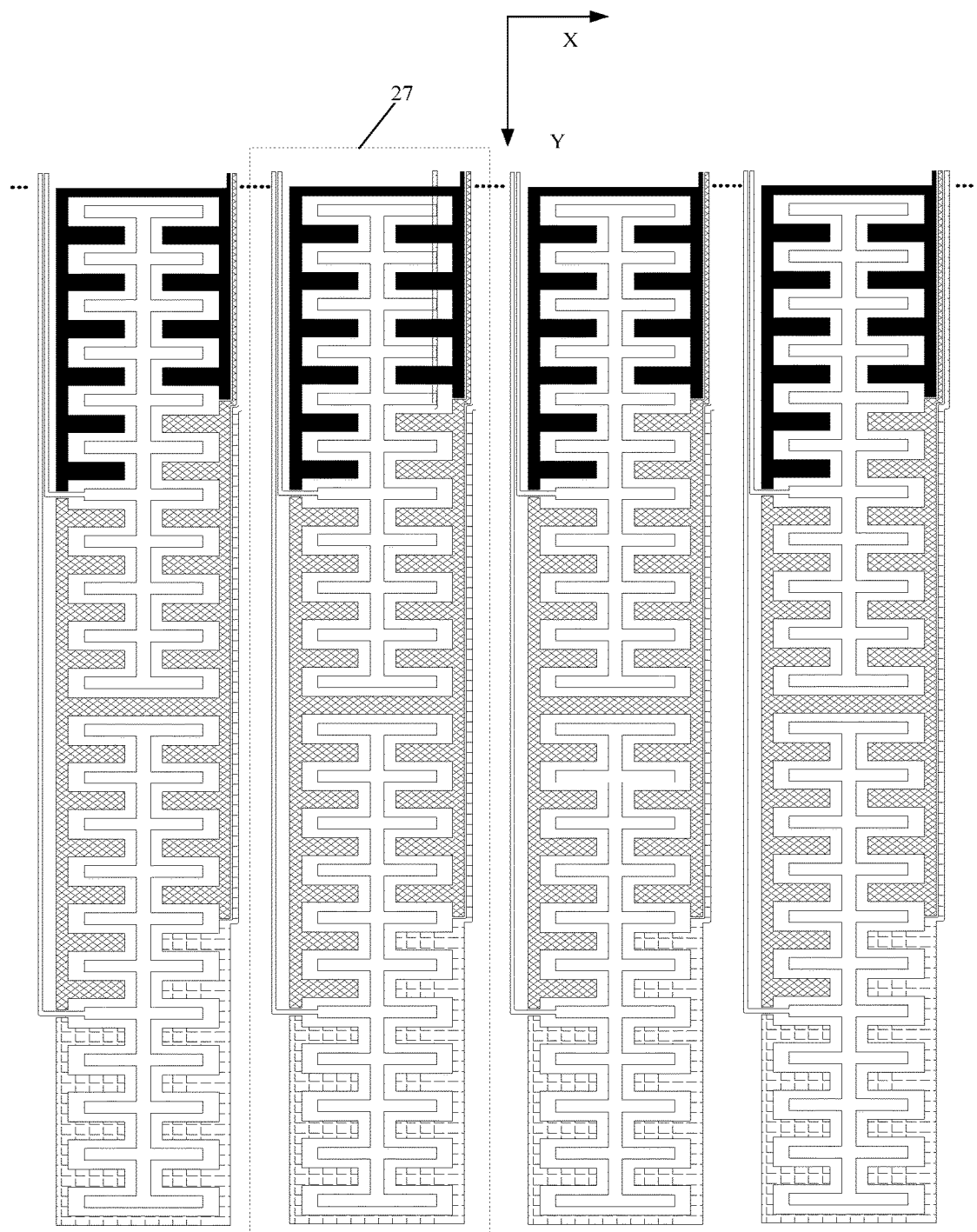
FIG. 5c is a schematic diagram showing a structure of multiple sensing electrode groups of the single-layer multi-point mutual capacitive touch screen according to another preferable embodiment of the disclosure.

Reference is made to FIG. 5b, which is a schematic diagram showing a specific structure of the multiple sensing electrode groups of the single-layer multi-point mutual capacitive touch screen shown in FIG. 2 according to a preferable embodiment. In FIG. 5b, two adjacent sensing electrode groups 27 are arranged in mirror symmetry in the first direction. Reference is made to FIG. 5c, which is a schematic diagram showing a structure of multiple sensing electrode groups of the single-layer multi-point mutual capacitive touch screen according to another preferable embodiment of the disclosure. For any one of the multiple sensing electrode groups 27, a direction of a connection line between the first electrode unit 21 and the second electrode unit 22 is the first direction. The single-layer multi-point mutual capacitive touch screens with sensing electrode groups 27 shown in FIG. 5b and FIG. 5c are on the basis of the structure shown in FIG. 5a.

Figure 6B:
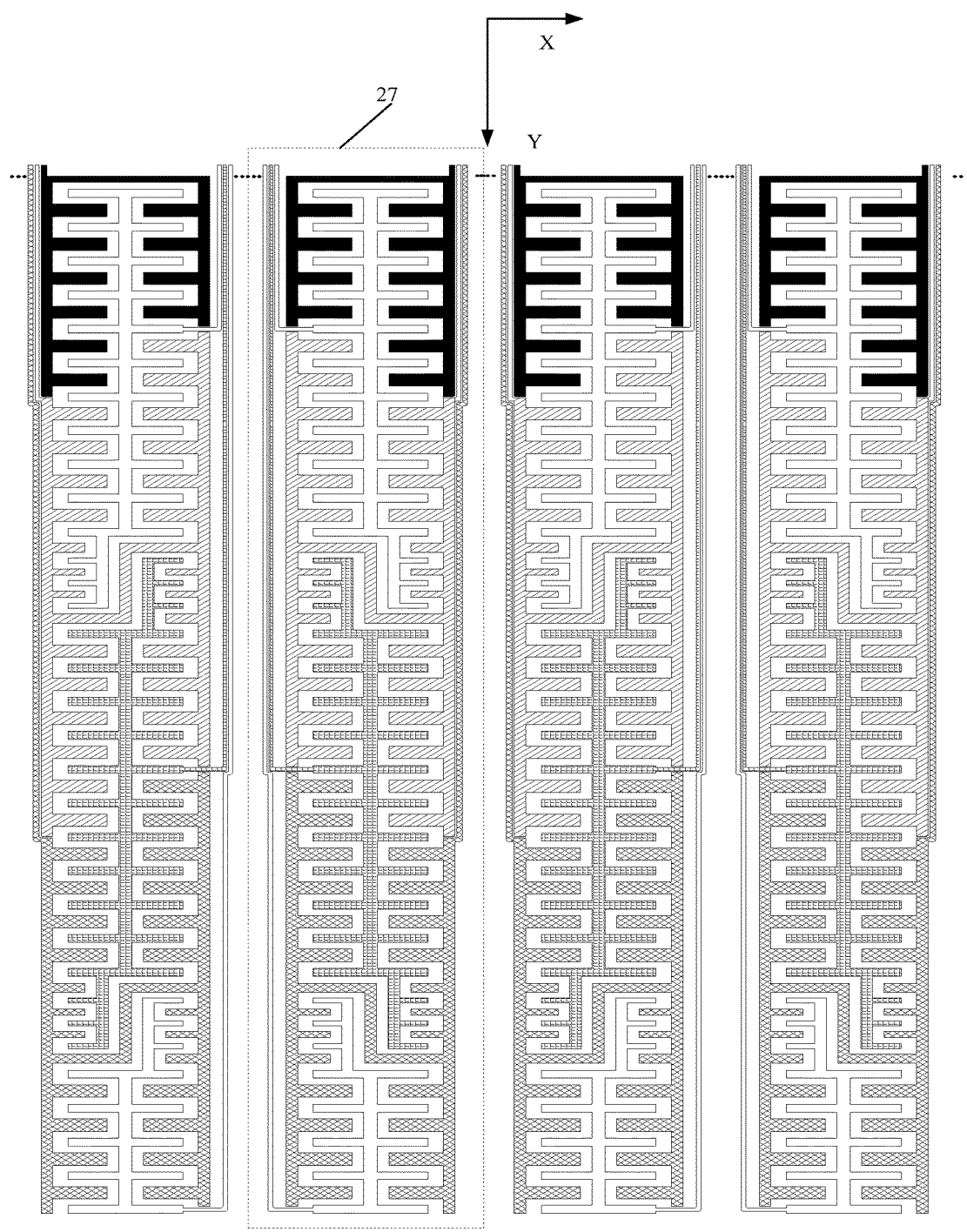
FIG. 6b is a schematic diagram showing a specific structure of the multiple sensing electrode groups of the single-layer multi-point mutual capacitive touch screen shown in FIG. 3 according to a preferable embodiment.
Figure 6C:
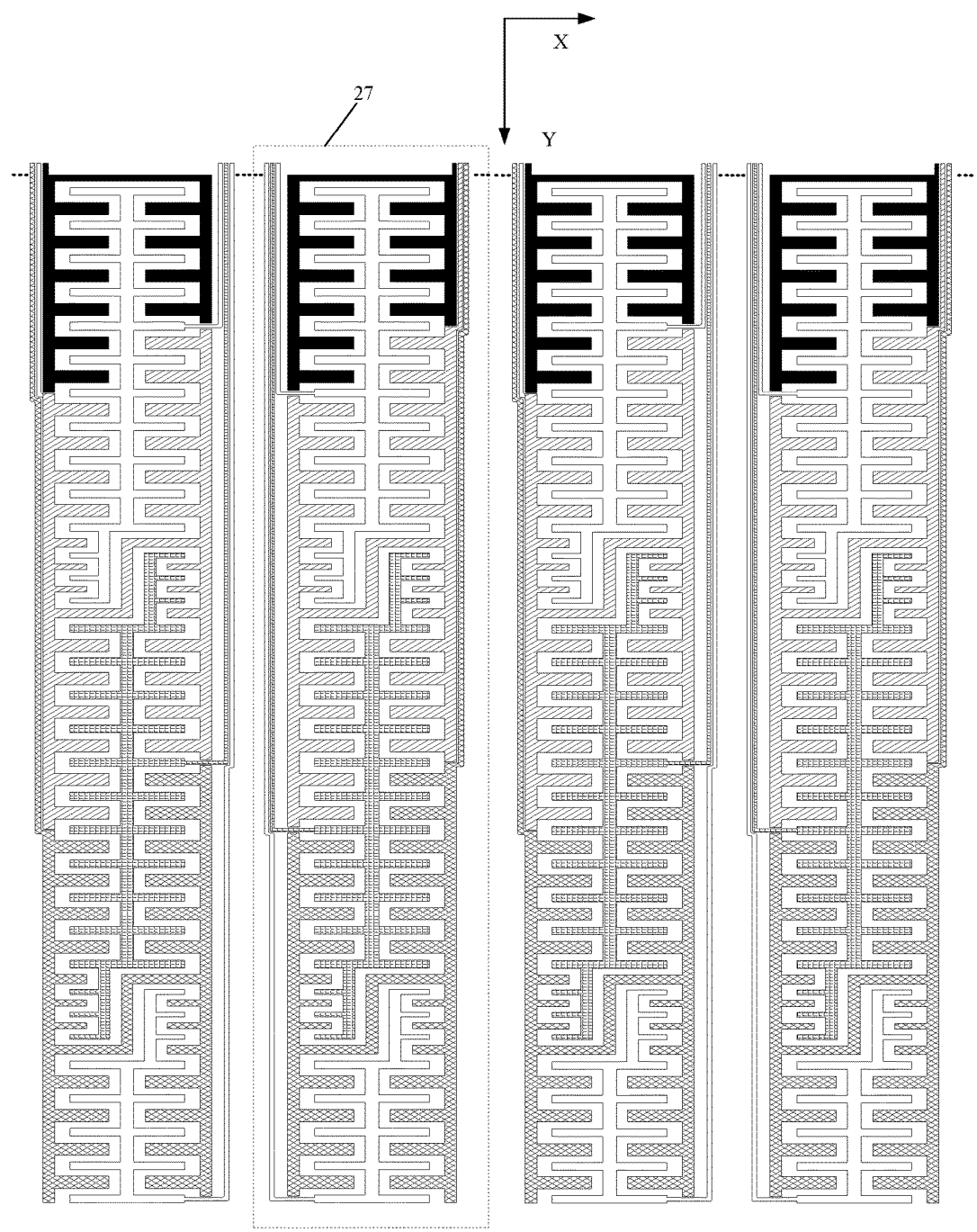
FIG. 6c is a schematic diagram showing a structure of the multiple sensing electrode groups of the single-layer multi-point mutual capacitive touch screen according to another preferable embodiment of the disclosure.

Reference is made to FIG. 6b, which is a schematic diagram showing a specific structure of the multiple sensing electrode groups of the single-layer multi-point mutual capacitive touch screen shown in FIG. 3 according to a preferable embodiment of the disclosure. In FIG. 6b, two adjacent sensing electrode groups 27 are arranged in mirror symmetry in the first direction. Reference is made to FIG. 6c, which is a schematic diagram showing a structure of multiple sensing electrode groups of a single-layer multi-point mutual capacitive touch screen according to another preferable embodiment of the disclosure. In FIG. 6c, the multiple sensing electrode groups 27 have a same structure and are arranged in an array. The single-layer multi-point mutual capacitive touch screens shown in FIG. 6b and FIG. 6c are on the basis of the structure shown in FIG. 6a.

Hereinafter, the case that two adjacent sensing electrode groups 27 are arranged in mirror symmetry is taken as an example in conjunction with specific data to illustrate that, with the technical solutions of the embodiments of the disclosure, the number of lines can be greatly decreased thereby decreasing the number of bonding pads 23 and reducing the width of the line dead region, thus the touch accuracy is improved and the cost is reduced. A 5-inch touch screen is taken as an example, and generally, the touch screen is arranged with a length of 8 pitches in the first direction and a length of 15 pitches in the second direction.

It should be noted that, the first electrode and the second electrode in each of the multiple sensing electrode groups 27 are not limited to the specific structures shown in FIGS. 5a, 5b, 5c, 6a, 6b, and 6c, and may have specific structures of other suitable types.

Figure 7:
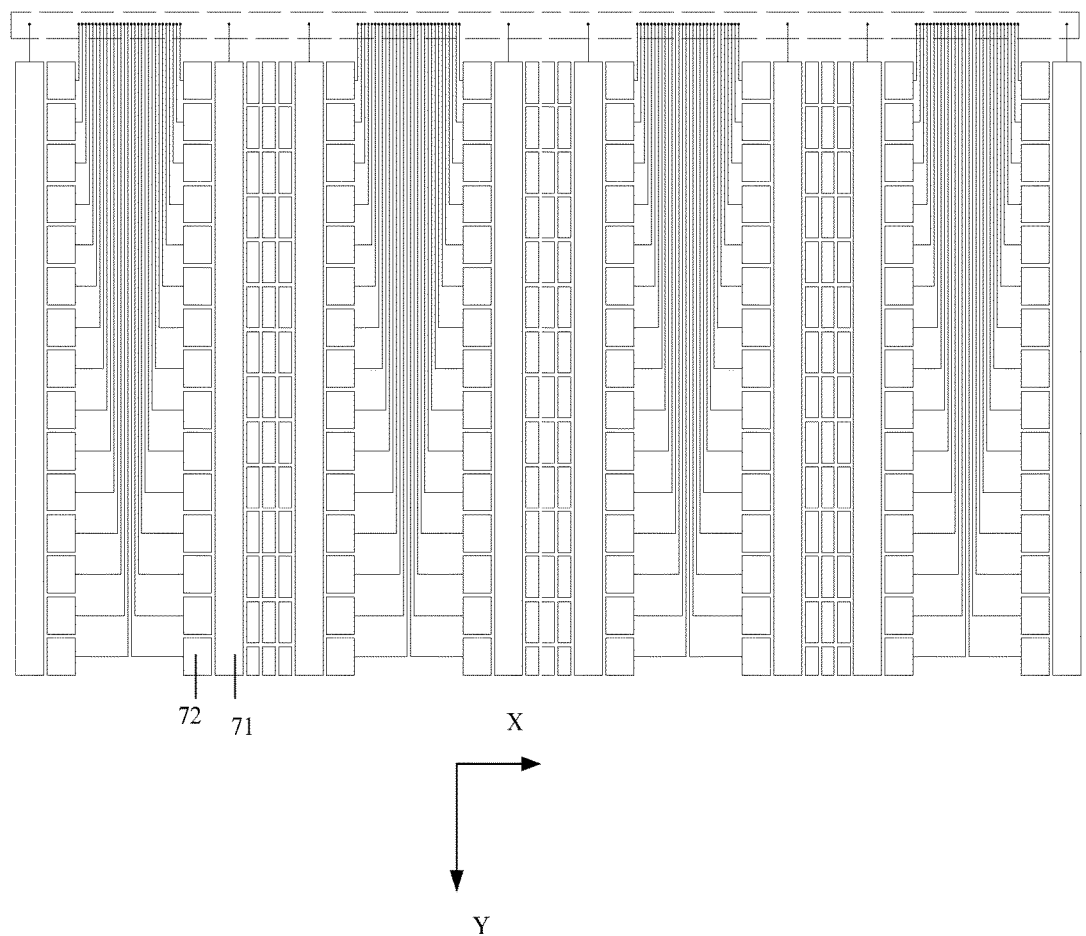
FIG. 7 is a schematic diagram showing a topological structure of a conventional single-layer multi-point mutual capacitive touch screen.

FIG. 7 is a schematic diagram showing a topological structure of a conventional single-layer multi-point mutual capacitive touch screen. If a single-layer multi-point mutual capacitive touch screen is arranged as shown in FIG. 7, each of sensing electrode groups includes 1 first electrode 71 and 15 second electrodes 72. The first electrode 71 has a length of 15 pitches, and the second electrode 72 has a length of 1 pitch. In this case, for each of the sensing electrode groups, 16 lines (1 first line and 15 second lines) are required, and for eight sensing electrode groups, a total of 16*8=128 lines are required. 30 second lines are arranged in the line dead region between two adjacent sensing electrode groups. 15 capacitive sensing nodes are formed in each sensing electrode group, and a total of 15*8=120 capacitive sensing nodes are formed in 8 sensing electrode groups.

Figure 8:
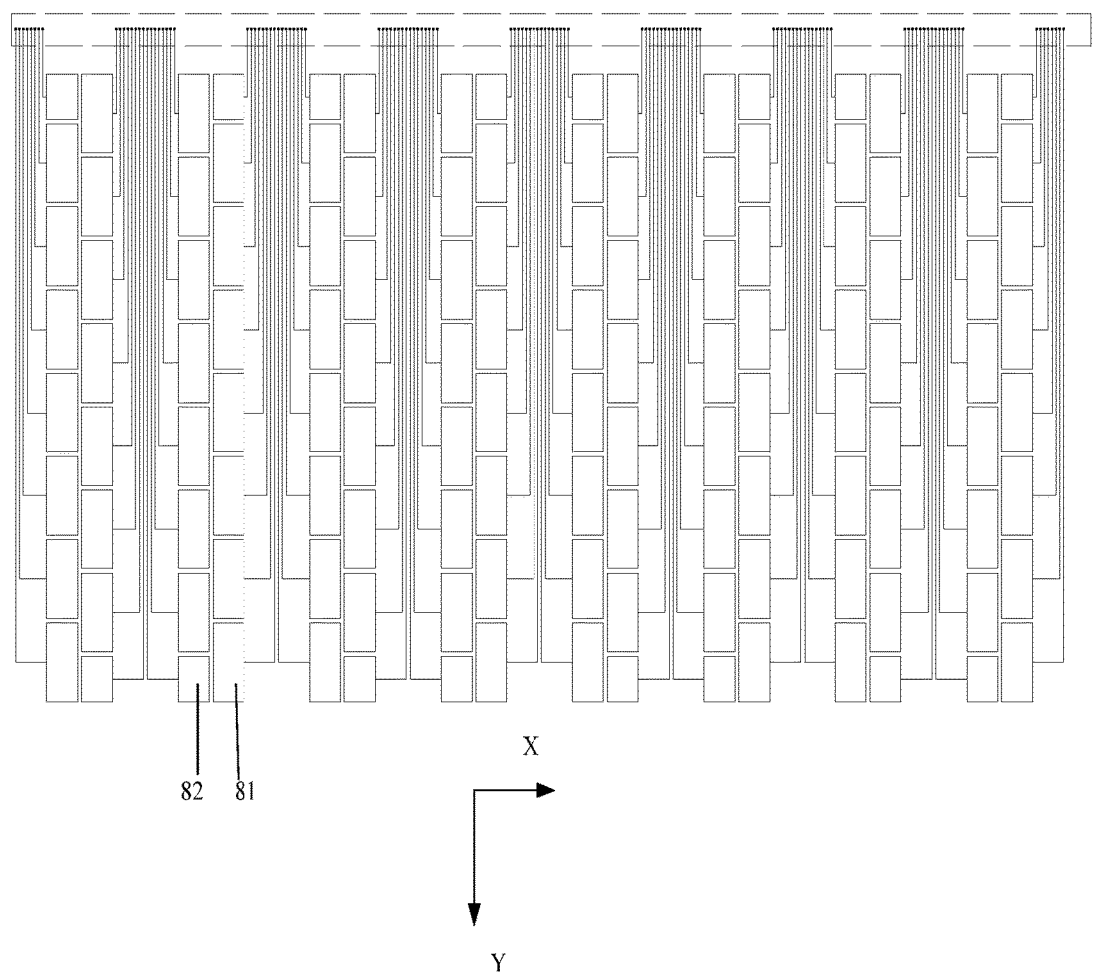
FIG. 8 is a schematic diagram showing a topological structure of another conventional single-layer multi-point mutual capacitive touch screen.

FIG. 8 is a schematic diagram showing a topological structure of another conventional single-layer multi-point mutual capacitive touch screen. If a single-layer multi-point mutual capacitive touch screen is arranged as shown in FIG. 8, each of sensing electrode groups includes 8 first electrodes 81 and 8 second electrode 82. In a same sensing electrode group, it may be arranged that in the Y direction, a first one of first electrodes 81 has a length of 1 pitch, each of the other first electrodes 81 has a length of 2 pitches, a last second electrode 82 has a length of 1 pitch, and each of the other second electrodes 82 has a length of 1 pitch. In this case, for each of the sensing electrode groups, 16 lines (8 first lines and 8 second lines) are required, and 15 capacitive sensing nodes are formed. In the arrangement shown in FIG. 8, similarly, there are 16*8=128 lines and 15*8=120 capacitive sensing nodes. 16 second lines are arranged in the line dead region between two adjacent sensing electrode groups.

Figure 9:
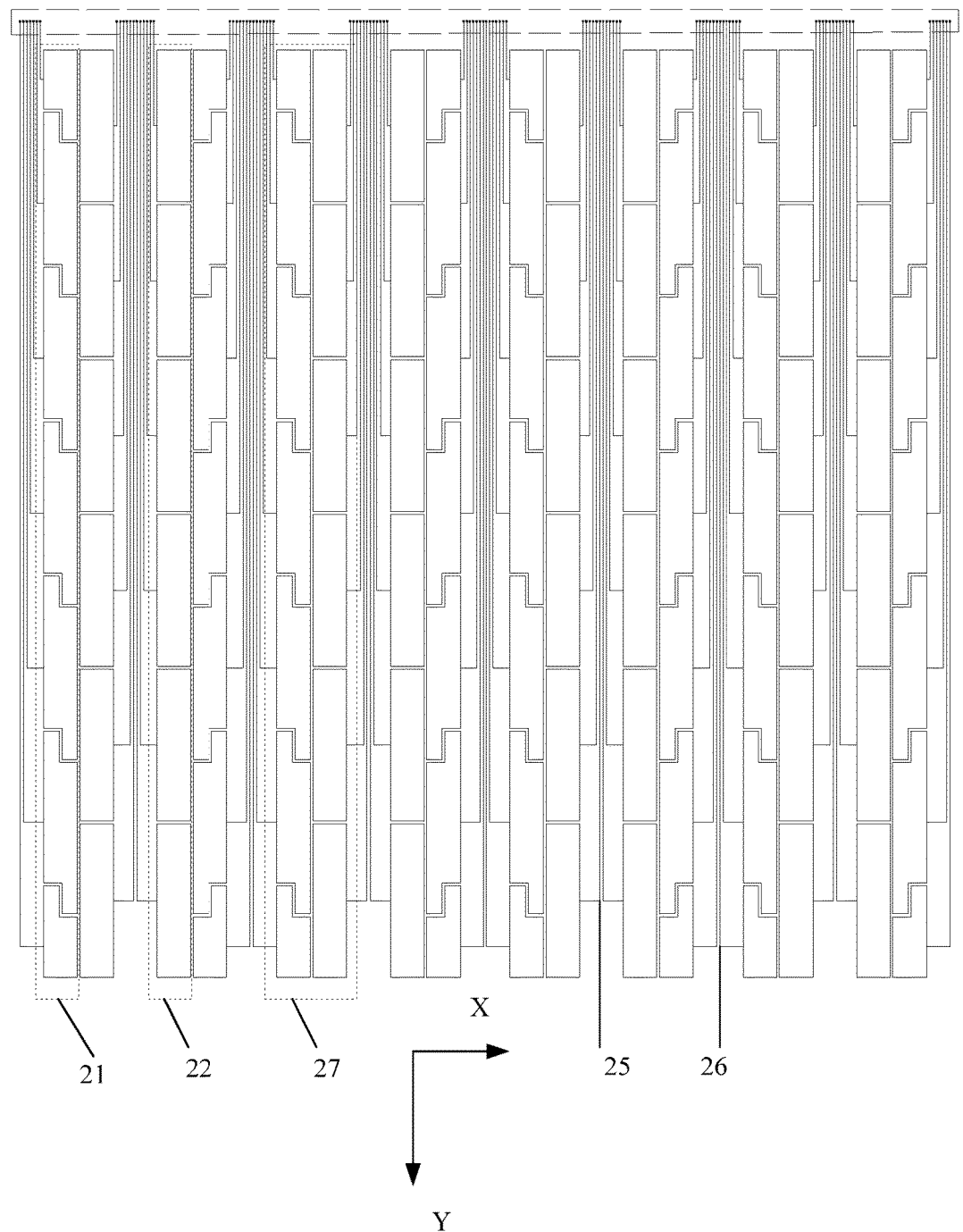
FIG. 9 is a schematic diagram showing a topological structure of a single-layer multi-point mutual capacitive touch screen according to another embodiment of the disclosure.

FIG. 9 is a schematic diagram showing a topological structure of a single-layer multi-point mutual capacitive touch screen according to another embodiment of the disclosure. If a single-layer multi-point mutual capacitive touch screen is arranged as shown in FIG. 9, a first electrode unit 21 and a second electrode unit 22 of a sensing electrode group 27 has a same structure and arrangement as the first electrode unit 21 and the second electrode unit 22 of the sensing electrode group 27 as shown in FIG. 2. The single-layer multi-point mutual capacitive touch screen as shown in FIG. 9 differs from single-layer multi-point mutual capacitive touch screen as shown in FIG. 2 in that the single-layer multi-point mutual capacitive touch screen as shown in FIG. 9 has four more sensing electrode groups and has 8 sensing electrode groups 27 in the first direction. In the single-layer multi-point mutual capacitive touch screen as shown in FIG. 9, there are 13*8=104 lines and 18*8=144 capacitive sensing nodes, and 16 second lines or 14 first lines are arranged in the line dead region between two adjacent sensing electrode groups 27. Therefore, as compared to the arrangements shown in FIG. 7 and FIG. 8, the number of lines is decreased (thus the number of bonding pads is decreased), the number of lines in the line dead region is decreased and the number of capacitive sensing nodes is increased. Therefore, the touch accuracy is efficiently improved and the fabrication cost is reduced. Furthermore, the width of the line dead region is reduced which can further improve the touch accuracy.

Figure 10:
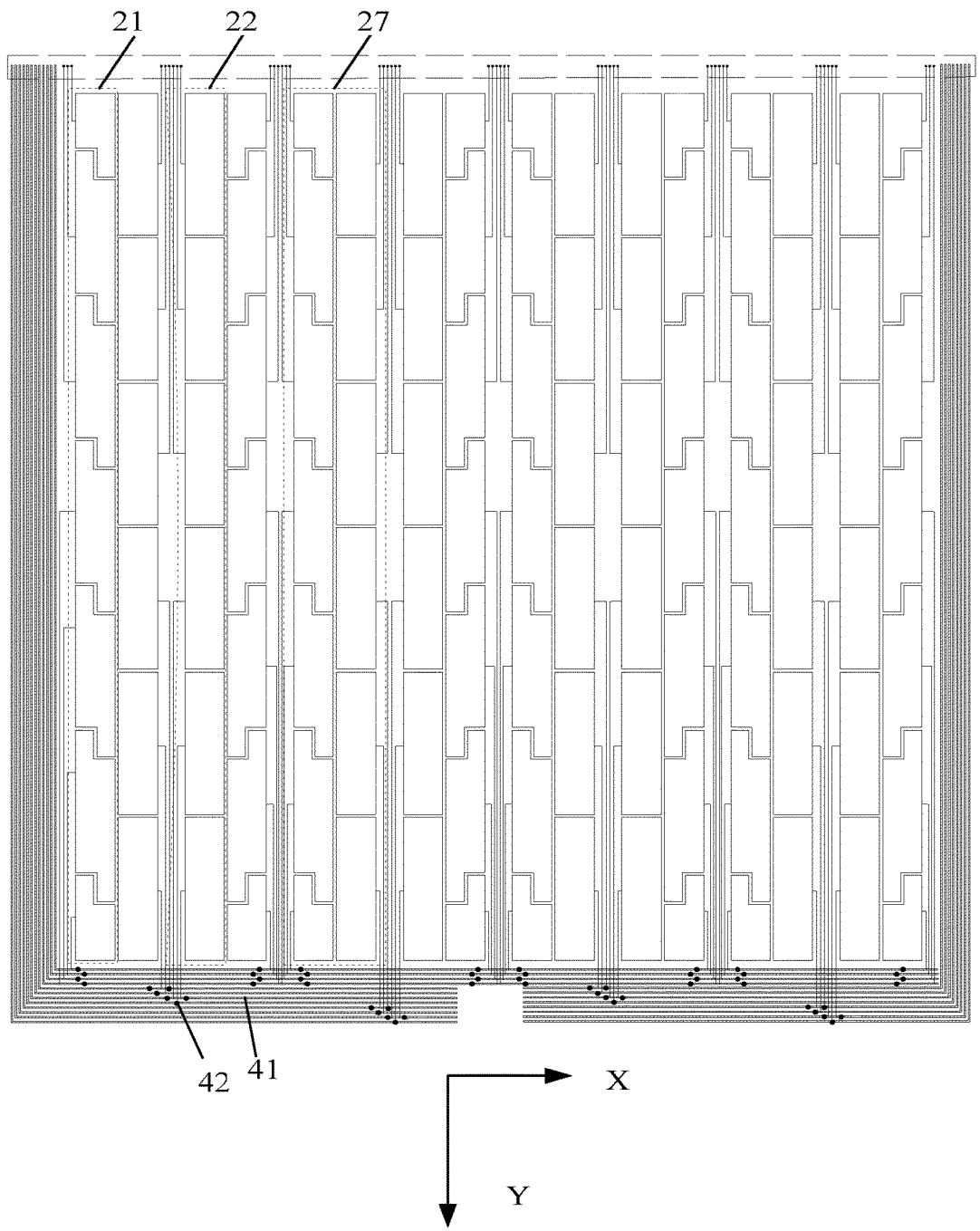
FIG. 10 is a schematic diagram showing a topological structure of a single-layer multi-point mutual capacitive touch screen according to another embodiment of the disclosure.

FIG. 10 is a schematic diagram showing a topological structure of a single-layer multi-point mutual capacitive touch screen according to another embodiment of the disclosure. If a single-layer multi-point mutual capacitive touch screen is arranged as shown in FIG. 10, a first electrode unit 21 and a second electrode unit 22 of a sensing electrode group 27 has a same structure and arrangement as the first electrode unit 21 and the second electrode unit 22 of the sensing electrode group 27 as shown in FIG. 9. The single-layer multi-point mutual capacitive touch screen as shown in FIG. 10 differs from single-layer multi-point mutual capacitive touch screen as shown in FIG. 9 in that in each of the sensing electrode groups 27, along the second direction, first lines corresponding to first to third first electrodes and second lines corresponding to first to third second electrodes are connected to corresponding bonding pads along a direction opposite to the second direction, and first lines corresponding to the other first electrodes and second lines corresponding to the other second electrodes are connected to jumper wires through via holes 42 disposed at a second end along the second direction, so as to be connected to the corresponding bonding pads through jumper wires 41.

In FIG. 10, the number of lines is the same as the number of lines shown in FIG. 9. Compared with the arrangement as shown in FIG. 9, in FIG. 10 lines in the line dead region extends in two different directions thus the width of the line dead region is further reduced. Furthermore, with above arrangement of the jumper wires in which first lines are reused, and jumper wires are shared, the number of lines and the number of bonding pads can be further decreased, and the cost can be further reduced and the touch accuracy can be further improved.

Figure 11:
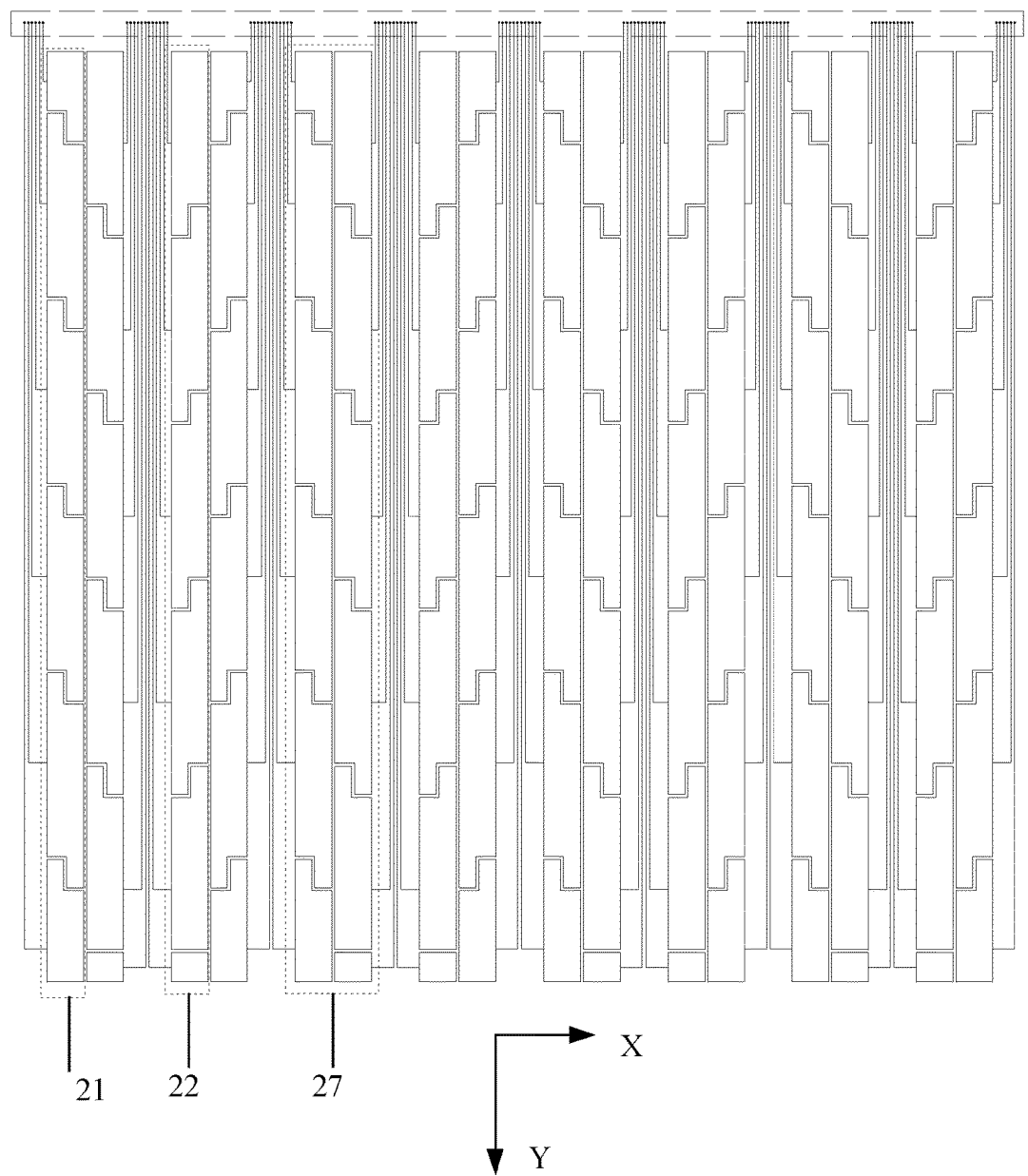
FIG. 11 is a schematic diagram showing a topological structure of a single-layer multi-point mutual capacitive touch screen according to another embodiment of the disclosure.

FIG. 11 is a schematic diagram showing a topological structure of a single-layer multi-point mutual capacitive touch screen according to another embodiment of the disclosure. If a single-layer multi-point mutual capacitive touch screen is arranged as shown in FIG. 11, a first electrode unit 21 and a second electrode unit 22 of a sensing electrode group 27 has a same structure and arrangement as the first electrode unit 21 and the second electrode unit 22 of the sensing electrode group 27 as shown in FIG. 3. The single-layer multi-point mutual capacitive touch screen as shown in FIG. 11 differs from single-layer multi-point mutual capacitive touch screen as shown in FIG. 3 in that the single-layer multi-point mutual capacitive touch screen as shown in FIG. 9 has four more sensing electrode groups and has 8 sensing electrode groups 27 in the first direction. There are 12*8=96 lines and 20*8=160 capacitive sensing nodes arranged in the single-layer multi-point mutual capacitive touch screen as shown in FIG. 11, 12 lines are arranged in the line dead region between two adjacent sensing electrode groups 27. Therefore, as compared to the arrangements shown in FIG. 7 and FIG. 8, similarly, the number of lines is decreased, the width of the line dead region is reduced, thus the touch accuracy is efficiently improved and the fabrication cost is reduced.

Figure 12:
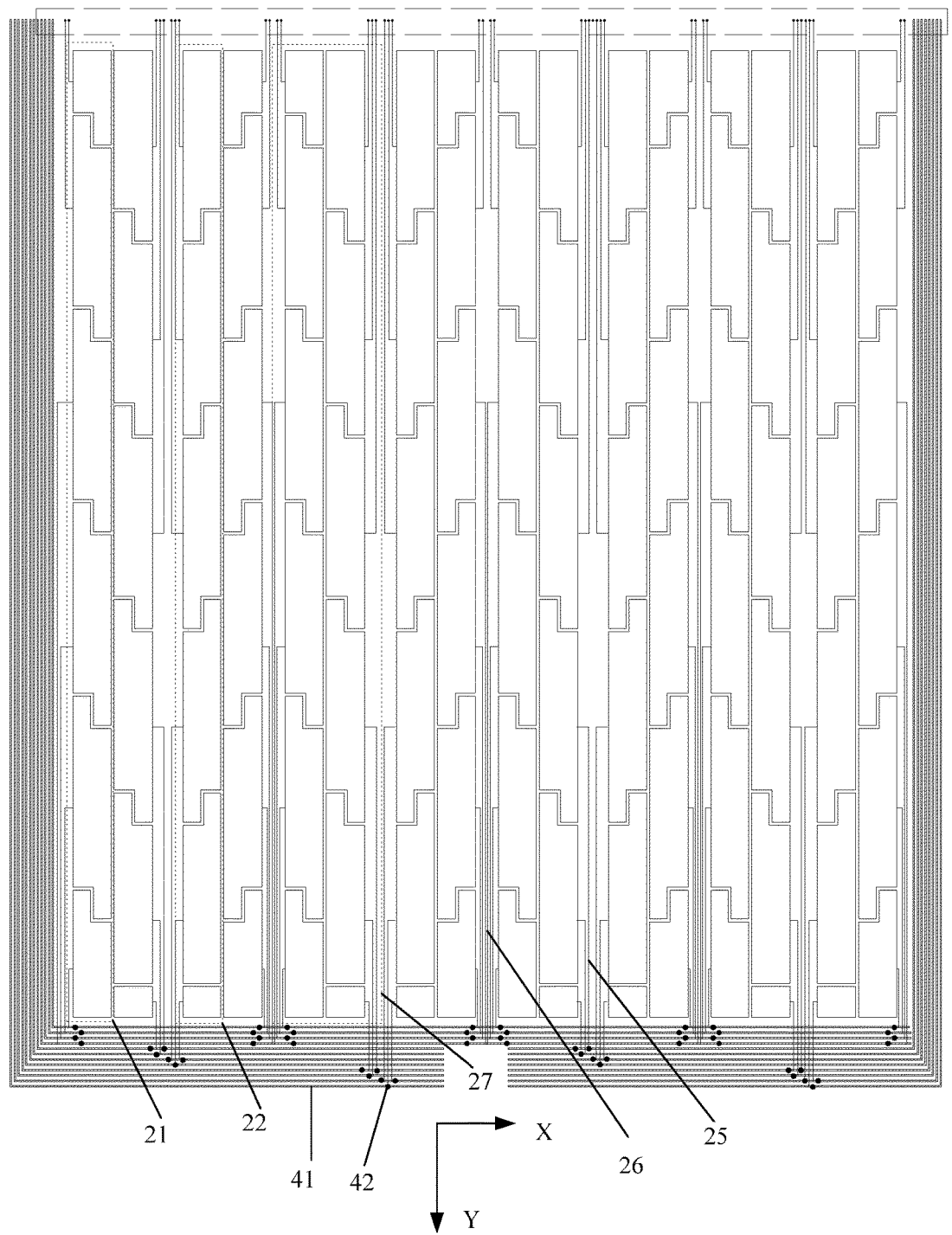
FIG. 12 is a schematic diagram showing a topological structure of a single-layer multi-point mutual capacitive touch screen according to another embodiment of the disclosure.

FIG. 12 is a schematic diagram showing a topological structure of a single-layer multi-point mutual capacitive touch screen according to another embodiment of the disclosure. If a single-layer multi-point mutual capacitive touch screen is arranged as shown in FIG. 12, a first electrode unit 21 and a second electrode unit 22 of a sensing electrode group 27 has a same structure and arrangement as the first electrode unit 21 and the second electrode unit 22 of the sensing electrode group 27 as shown in FIG. 11. The single-layer multi-point mutual capacitive touch screen as shown in FIG. 12 differs from single-layer multi-point mutual capacitive touch screen as shown in FIG. 11 in that in each sensing electrode group 27, in the second direction, first lines 26 corresponding to first and second first electrodes and second lines 25 corresponding to first to third second electrodes are connected to corresponding bonding pads 23 along a direction opposite to the second direction, and first lines 26 corresponding to the other first electrodes and second lines 25 corresponding to the other second electrodes are connected, along the second direction, to corresponding jumper wires via holes 42 disposed at the second end, so as to be connected to the corresponding bonding pads.

In FIG. 12, the number of lines is the same as the number of lines shown in FIG. 11. Compared with the arrangement as shown in FIG. 11, in FIG. 12, lines in the line dead region extends in two different directions thus the width of the line dead region is further reduced. Furthermore, with above arrangement of the jumper wires in which first lines are reused, and jumper wires are shared, the number of lines and the number of bonding pads can be further decreased, and the cost can be further reduced and the touch accuracy can be further improved. bonding pad It should be noted that, the single-layer multi-point mutual capacitive touch screen is a mutual capacitive touch screen with first electrodes and second electrodes formed from a single layer of electrode, which can achieve multi-point touch.

As can be seen from the above description, in the single-layer multi-point mutual capacitive touch screen, the number of lines and the number of bonding pads are decreased, and the width of the line dead region is reduced, while the touch accuracy is improved and the fabrication cost is reduced.

An electronic apparatus is further provided according to the embodiment of the disclosure. Reference is made to FIG. 13, which is a schematic structural diagram of an electronic apparatus 131 according to an embodiment of the disclosure. The electronic apparatus 131 includes a single-layer multi-point mutual capacitive touch screen 132, where the single-layer multi-point mutual capacitive touch screen 132 may be the single-layer multi-point mutual capacitive touch screen according to any one of the above embodiments. The electronic apparatus 131 may be a cell phone, a tablet computer, a navigation device, etc.

In addition, the electronic apparatus 131 further includes a flexible printed circuit board (FPC) and a touch chip (not shown in the drawings), where the touch chip is electrically connected to the single-layer multi-point mutual capacitive touch screen 132 though the FPC, and configured to provide a drive signal to the single-layer multi-point mutual capacitive touch screen 132 and receive a sensing signal from the single-layer multi-point mutual capacitive touch screen 132 thereby achieving the touch detection function.

Since the electronic apparatus 131 is provided with the single-layer multi-point mutual capacitive touch screen according to any one of the above embodiments, the electronic apparatus 131 has a high touch accuracy and a low fabrication cost. Furthermore, since the number of the bonding pads 23 can be decreased, a width of the FPC connected to the bonding pads 23 can be reduced accordingly, thus the cost can be further reduced.

The connection relationship between the touch chip of the electronic apparatus 131 and the first electrodes and second electrodes of the single-layer multi-point mutual capacitive touch screen according to the disclosure is described below in conjunction with the schematic diagram of the single-layer multi-point mutual capacitive touch screen according to any one of the above embodiments.

The touch chip includes multiple pins which are configured to transmit a signal between the touch chip and the single-layer multi-point mutual capacitive touch screen. For each of the m sensing electrode groups 27, the n first electrodes are connected to respective pins of the touch chip; and along the second direction, odd-numbered second electrodes of the second electrode unit 22 are connected to a same pin of the touch chip, and even-numbered second electrodes of the second electrode unit 22 are connected to a same pin of the touch chip, where the odd-numbered second electrodes and the even-numbered second electrodes are connected to different pins.

For different sensing electrode groups, along the second direction, the first electrodes of first electrode units 21 with respect to a same position in an order of first electrodes are connected to a same pin of the touch chip, and second electrodes of second electrode units 22 with respect to a same position in the order of second electrodes are connected to different pins of the touch chip; and second electrodes of different sensing electrode groups 27 are connected to different pins of the touch chip.

With the above descriptions of the disclosed embodiments, those skilled in the art may achieve or use the present disclosure. Various modifications to the embodiments are apparent for those skilled in the art. The general principle defined herein may be implemented in other embodiments without departing from the spirit or scope of the disclosure. Therefore, the present disclosure is not limited to the embodiments disclosed herein, but confirm to the widest scope in consistent with the principle and the novel features disclosed herein.

The invention claimed is:

1. A single-layer multi-point mutual capacitive touch screen, comprising:
    m sensing electrode groups arranged along a first direction, wherein:
        m is a positive integer greater than 1 and is an even number, each of the m sensing electrode groups comprises a first electrode unit extending in a second direction and a second electrode unit extending in the second direction, the first electrode unit and the second electrode unit are arranged opposite to each other in the first direction, the second direction is perpendicular to the first direction,
        and every two adjacent sensing electrode groups of the m sensing electrode groups are arranged in mirror symmetry;
    the first electrode unit comprises first to n-th first electrodes arranged along the second direction, wherein n is a positive integer greater than 1, and the second electrode unit comprises a plurality of second electrodes;
    a plurality of bonding pads arranged along the first direction, wherein the plurality of bonding pads are disposed at a first end of the m sensing electrode groups, first electrodes and second electrodes of the m sensing electrode groups are respectively connected to corresponding bonding pads;
    a plurality of first lines, configured to connect the first electrodes to the bonding pads corresponding to the first electrodes; and
    a plurality of second lines, configured to connect the second electrodes to the bonding pads corresponding to the second electrodes,
    wherein the first electrodes are configured to function as touch sensing electrodes and the second electrodes are configured to function as touch driving electrodes, or the first electrodes are configured to function as touch driving electrodes and the second electrodes are configured to function as touch sensing electrodes, and for a same first electrode unit, a first electrode is partially arranged opposite to an adjacent first electrode in the first direction;

and wherein in the every two adjacent sensing electrode groups of the m sensing electrode groups, the first electrode unit of one sensing electrode group is adjacent to the first electrode unit of the other sensing electrode group, and each of two first electrode units comprises a first part of first electrodes and a second part of first electrodes along the second direction;

along the second direction, last ones of first electrodes of two first parts are connected to a corresponding bonding pad through a same first line, and the other first electrodes of the two first parts are connected to corresponding bonding pads through respective first lines, wherein first lines corresponding to first electrodes of the two first parts are connected from the first electrodes to corresponding bonding pads along a direction opposite to the second direction; and along the second direction, first ones of first electrodes of two second parts are connected to a corresponding bonding pad through a same first line, and the other first electrodes of the two second parts are connected to corresponding bonding pads through respective first lines, wherein the first lines corresponding to first electrodes of the two second parts are connected, along the second direction, from the first electrodes to via holes disposed at a second end of the m sensing electrode groups, and are connected to the corresponding bonding pads through jumper wires connected to the via holes, wherein the second end is arranged opposite to the first end, and the jumper wires are connected to respective bonding pads;

or the second electrode unit of one sensing electrode group is adjacent to the second electrode unit of the other sensing electrode group, and each of two second electrode units comprise a first part of second electrodes and a second part of second electrodes along the second direction;

second electrodes of two first parts are connected to corresponding bonding pads through respective second lines, wherein second lines corresponding to second electrodes of the two first parts are connected from the second electrodes to corresponding bonding pads along a direction opposite to the second direction; and second electrodes of two second parts are connected to corresponding bonding pads through respective second lines, wherein second lines corresponding to second electrodes of the two second parts are connected from the second electrodes to via holes disposed at the second end of the m sensing electrode groups along the second direction, and are connected to the corresponding bonding pads through jumper wires connected to the via holes, wherein the second end is arranged opposite to the first end, and the jumper wires are connected to respective bonding pads.

2. The single-layer multi-point mutual capacitive touch screen according to claim 1, wherein the second electrode unit comprises first second electrode to k-th second electrode arranged along the second direction, wherein k is a positive integer greater than 1;

for an i-th second electrode, in the first direction, the i-th second electrode is partially arranged opposite to an i-th first electrode and partially arranged opposite to an (i+1)-th first electrode, wherein i is a positive integer smaller than k.

3. The single-layer multi-point mutual capacitive touch screen according to claim 2, wherein in a same second electrode unit, for at least part of the k second electrodes, each second electrode is arranged opposite to an adjacent second electrode in the first direction.

4. The single-layer multi-point mutual capacitive touch screen according to claim 2, wherein in a same sensing electrode group, in the first direction, in a case that k=n−1, a k-th second electrode is partially arranged opposite to a (n−1)-th first electrode and partially arranged opposite to a n-th first electrode; and in a case that k=n, an entire k-th second electrode is arranged opposite to a portion of the n-th first electrode.

5. The single-layer multi-point mutual capacitive touch screen according to claim 1, wherein the first end is in proximity to first ones of first electrodes of the m sensing electrode groups.

6. The single-layer multi-point mutual capacitive touch screen according to claim 1, wherein every two of the plurality of first lines does not intersect with each other, every two of the plurality of second lines does not intersect with each other, and each of the plurality of first lines and each of the plurality of second lines does not intersect with each other.

7. The single-layer multi-point mutual capacitive touch screen according to claim 1, wherein in two adjacent sensing electrode groups in which the first electrode unit of one sensing electrode group is adjacent to the first electrode unit of the other sensing electrode group, last ones of first electrodes of two first electrode units of the two adjacent sensing electrode groups are connected to a same bonding pad through a same first line; and the other first electrodes of the two first electrode units of the two adjacent sensing electrode groups are connected to corresponding bonding pads through respective first lines, wherein all first lines corresponding to first electrodes of the two adjacent sensing electrode groups are connected from the first electrodes to corresponding bonding pads along a direction opposite to the second direction.

8. The single-layer multi-point mutual capacitive touch screen according to claim 1, wherein in two adjacent sensing electrode groups in which the second electrode unit of one sensing electrode group is adjacent to the second electrode unit of the other sensing electrode group, second electrodes of two second electrode units of the two adjacent sensing electrode groups are connected to corresponding bonding pads through respective second lines, wherein all second lines corresponding to second electrodes of the two adjacent sensing electrode groups are connected from the second electrodes to corresponding bonding pads along a direction opposite to the second direction.

9. The single-layer multi-point mutual capacitive touch screen according to claim 1, wherein the first lines corresponding to the first electrodes of the two first parts are connected to corresponding via holes disposed at the first end, and are connected to the corresponding bonding pads through jumper wires connected to the via holes.

10. The single-layer multi-point mutual capacitive touch screen according to claim 9, wherein in the two adjacent sensing electrode groups, for the first electrodes connected to corresponding bonding pads through jumper wires and via holes, along the second direction, first lines of two first electrodes having a same position in an order of first electrodes are connected to a corresponding bonding pad through a same jumper wire, wherein the first lines are connected to the jumper wire through a via hole.

11. The single-layer multi-point mutual capacitive touch screen according to claim 1, wherein the second lines corresponding to the second electrodes of the two first parts are connected to corresponding via holes disposed at the first end, and are connected to the corresponding bonding pads through jumper wires connected to the via holes.

12. The single-layer multi-point mutual capacitive touch screen according to claim 11, wherein in the two adjacent sensing electrode groups, for the second electrodes connected to corresponding bonding pads through jumper wires and via holes, odd-numbered second electrodes are connected through a same jumper wire, and even-numbered second electrodes are connected to a same jumper wire.

13. The single-layer multi-point mutual capacitive touch screen according to claim 1, wherein one of the first electrode unit and the second electrode unit is defined as a first type of electrode unit, and the other one of the first electrode unit and the second electrode unit is defined as a second type of electrode unit;
lines of electrodes of electrode units of the first type are connected to corresponding bonding pads along a direction opposite to the second direction; and
lines of electrodes of electrode units of the second type are connected to corresponding via holes disposed at a second end of the m sensing electrode groups along the second direction, and are connected to corresponding bonding pads through jumper wires connected to the via holes, wherein the second end is arranged opposite to the first end, and the jumper wires are connected to respective bonding pads.

14. The single-layer multi-point mutual capacitive touch screen according to claim 13, wherein
the lines of the electrodes of the electrode units of the first type are connected to via holes disposed at the first end, and are connected to the corresponding bonding pads through jumper wires connected to the via holes.

15. The single-layer multi-point mutual capacitive touch screen according to claim 1, wherein the first electrode comprises: a first comb electrode and a second comb electrode which are partially arranged opposite to each other along the first direction, wherein
each of the first comb electrode and the second comb electrode comprises a plurality of first branch electrodes, wherein the plurality of first branch electrodes of the first comb electrode extends in the first direction, the plurality of first branch electrodes of the second comb electrode extends in the direction opposite to the first direction; the first comb electrode is electrically connected to the second comb electrode; and for the opposite portion of the first comb electrode and the opposite portion of the second comb electrode in the first direction, first branch electrodes of the first comb electrode have a one-to-one correspondence with first branch electrodes of the second comb electrode.

16. The single-layer multi-point mutual capacitive touch screen according to claim 15, wherein in a same first electrode unit, the first comb electrode and the second comb electrode of the first one of first electrodes have different lengths in the second direction, the first comb electrode and the second comb electrode of an n-th first electrode have different lengths in the second direction, and the first comb electrode and the second comb electrode of each of the other first electrodes have a same length in the second direction.

17. The single-layer multi-point mutual capacitive touch screen according to claim 16, wherein the second electrode comprises a plurality of second branch electrodes, wherein the plurality of second branch electrodes are arranged between the first comb electrode and the second comb electrode, and
each of the plurality of second branch electrodes comprises a first branch element extending in the direction opposite to the first direction and a second branch element extending in the first direction, wherein
the first branch element is arranged between and coupled with two corresponding first branch electrodes of the first comb electrode, and
the second branch element is arranged between and coupled with two corresponding first branch electrodes of the second comb electrode.

18. The single-layer multi-point mutual capacitive touch screen according to claim 16, wherein for the first one of first electrodes, along the second direction, the first one of first branch electrodes of the first comb electrode is electrically connected to the first one of first branch electrodes of the second comb electrode.

19. The single-layer multi-point mutual capacitive touch screen according to claim 18, wherein for the n-th first electrode, along the second direction, a last one of first branch electrode of the first comb electrode is electrically connected to a last one of first branch electrode of the second comb electrode; and
for a p-th first electrode, one of the plurality of first branch electrodes of the first comb electrode is electrically connected to one of the plurality of first branch electrode of the second comb electrode, and the two electrically connected first branch electrodes are arranged opposite to each other in the first direction, wherein p is a positive integer greater than 1 and less than n.

20. The single-layer multi-point mutual capacitive touch screen according to claim 18, wherein for a q-th first electrode, one of the plurality of first branch electrodes of the first comb electrode is electrically connected to one of the plurality of first branch electrodes of the second comb electrode, and the two electrically connected first branch electrodes are staggered in the first direction, wherein q is a positive integer greater than 1 and smaller than n.

21. The single-layer multi-point mutual capacitive touch screen according to claim 1, wherein the m sensing electrode groups have a same structure and are arranged in an array.

22. An electronic apparatus, comprising:
a single-layer multi-point mutual capacitive touch screen, which comprises:
m sensing electrode groups arranged along a first direction, wherein m is a positive integer greater than 1, each of the m sensing electrode groups comprises a first electrode unit extending in a second direction and a second electrode unit extending in the second direction, the first electrode unit and the second electrode unit are arranged opposite to each other in the first direction, the second direction is perpendicular to the first direction, the first electrode unit comprises first to n-th first electrodes arranged along the second direction, wherein n is a positive integer greater than 1, and the second electrode unit comprises a plurality of second electrodes;

a plurality of bonding pads arranged along the first direction, wherein the plurality of bonding pads are disposed at a first end of the m sensing electrode groups, first electrodes and second electrodes of the m sensing electrode groups are respectively connected to corresponding bonding pads;

a plurality of first lines, configured to connect the first electrodes to the bonding pads corresponding to the first electrodes; and a plurality of second lines, configured to connect the second electrodes to the bonding pads corresponding to the second electrodes, wherein the first electrodes are configured to function as touch sensing electrodes and the second electrodes are configured to function as touch driving electrodes, or the first electrodes are configured to function as touch driving electrodes and the second electrodes are configured to function as touch sensing electrodes, and for a same first electrode unit, a first electrode is partially arranged opposite to an adjacent first electrode in the first direction; and a touch chip, which comprises a plurality of pins and is configured to transmit a signal with the m sensing electrode groups through the plurality of pins, wherein for each of the m sensing electrode groups, the n first electrodes are connected to respective pins of the touch chip; and along the second direction, odd-numbered second electrodes of the second electrode unit are connected to a same pin of the touch chip, and even-numbered second electrodes of the second electrode unit are connected to a same pin of the touch chip wherein the odd-numbered second electrodes and the even-numbered second electrodes are connected to different pins.

23. The electronic apparatus according to claim 22, further comprising a flexible circuit board, wherein the touch chip is electrically connected to the single-layer multi-point mutual capacitive touch screen though the flexible circuit board, and the flexible circuit board is connected to the plurality of bonding pads.

24. The electronic apparatus according to claim 22, wherein for different sensing electrode groups, along the second direction, the first electrodes of first electrode units with respect to a same position in an order of first electrodes are connected to a same pin of the touch chip, and second electrodes of second electrode units with respect to a same position in an order of second electrodes are connected to different pins of the touch chip.

25. The electronic apparatus according to claim 22, wherein second electrodes of different sensing electrode groups are connected to different pins of the touch chip.

* * * * *